US012444835B2

(12) United States Patent
Wu et al.

(10) Patent No.: US 12,444,835 B2
(45) Date of Patent: Oct. 14, 2025

(54) ANTENNA APPARATUS AND ELECTRONIC DEVICE

(71) Applicant: Huawei Technologies Co., Ltd., Shenzhen (CN)

(72) Inventors: Pengfei Wu, Shanghai (CN); Jiahui Chu, Shanghai (CN); Hanyang Wang, Reading (GB); Meng Hou, Shanghai (CN); Chien-Ming Lee, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 171 days.

(21) Appl. No.: 18/256,238

(22) PCT Filed: Dec. 2, 2021

(86) PCT No.: PCT/CN2021/135167

§ 371 (c)(1),
(2) Date: Jun. 7, 2023

(87) PCT Pub. No.: WO2022/121776

PCT Pub. Date: Jun. 16, 2022

(65) Prior Publication Data

US 2024/0021982 A1 Jan. 18, 2024

(30) Foreign Application Priority Data

Dec. 8, 2020 (CN) ......................... 202011423001.9

(51) Int. Cl.
*H01Q 1/22* (2006.01)
*H01Q 1/24* (2006.01)
(Continued)

(52) U.S. Cl.
CPC ................. *H01Q 1/52* (2013.01); *H01Q 1/22* (2013.01); *H01Q 1/36* (2013.01); *H01Q 9/0421* (2013.01)

(58) Field of Classification Search
CPC ............ H01Q 1/22; H01Q 1/24; H01Q 1/243; H01Q 1/36; H01Q 1/44; H01Q 1/52;
(Continued)

(56) References Cited

U.S. PATENT DOCUMENTS 7,345,638 B1 * 3/2008 Tan ...................... H01Q 9/0407 343/702
9,246,210 B2 * 1/2016 Korva .................... H01Q 1/241
(Continued)

FOREIGN PATENT DOCUMENTS

CN 109390679 A 2/2019
CN 109962331 A 7/2019
(Continued)

*Primary Examiner* — Tho G Phan
(74) *Attorney, Agent, or Firm* — Conley Rose, P.C.

(57) ABSTRACT

An antenna apparatus for an electronic device having a middle frame, a cover, and a battery located between the middle frame and the cover. The antenna apparatus includes at least one group of coupling feeding elements and at least one group of radiation elements. A first radiator and a second radiator in each group of radiation elements are arranged on an inner surface of a cover. The first radiator and the second radiator are respectively located on two sides of a coupling feeding element, and the coupling feeding element is separately coupled to feed the first radiator and the second radiator.

20 Claims, 44 Drawing Sheets

(51) Int. Cl.
*H01Q 1/36* (2006.01)
*H01Q 1/52* (2006.01)
*H01Q 9/04* (2006.01)

(58) Field of Classification Search
CPC ............ H01Q 5/38; H01Q 5/385; H01Q 9/04; H01Q 9/0421; H01Q 1/48; H01Q 1/50
See application file for complete search history.

(56) References Cited

U.S. PATENT DOCUMENTS

| | | | | |
|---|---|---|---|---|
| 9,647,337 | B1 * | 5/2017 | Kuo | H01Q 5/364 |
| 10,096,888 | B2 * | 10/2018 | Ahn | H01Q 9/0414 |
| 10,511,079 | B2 * | 12/2019 | Wu | H01Q 1/2266 |
| 10,658,732 | B2 * | 5/2020 | Kim | H01Q 9/30 |
| 10,700,409 | B2 * | 6/2020 | Huang | H01Q 1/2266 |
| 12,062,856 | B2 * | 8/2024 | Hsu | H01Q 21/28 |
| 2003/0045324 | A1 | 3/2003 | Nagumo et al. | |
| 2011/0128190 | A1 | 6/2011 | Galeev | |
| 2011/0248895 | A1 | 10/2011 | Bungo et al. | |
| 2015/0130669 | A1 | 5/2015 | Sonoda et al. | |
| 2017/0194692 | A1 | 7/2017 | Sayama et al. | |
| 2020/0274231 | A1 | 8/2020 | Wei et al. | |

FOREIGN PATENT DOCUMENTS

| | | | |
|---|---|---|---|
| CN | 111092292 | A | 5/2020 |
| TW | M592170 | U | 3/2020 |

* cited by examiner

ANTENNA APPARATUS AND ELECTRONIC DEVICE

CROSS-REFERENCE TO RELATED APPLICATIONS

This is a U.S. National Stage of International Patent Application No. PCT/CN2021/135167 filed on Dec. 2, 2021, which claims priority to Chinese Patent Application No. 202011423001.9 filed on Dec. 8, 2020. Both of the aforementioned applications are hereby incorporated by reference in their entireties.

TECHNICAL FIELD

Embodiments of this application relate to the field of terminal technologies, and in particular, to an antenna apparatus and an electronic device.

BACKGROUND

With continuous development of communication technologies, a multiple-input multiple-output (Multiple-Input Multiple-Output, MIMO) antenna technology is more widely used in an electronic device, and a requirement is increasingly high. Therefore, a quantity of antennas increases exponentially, and more frequency bands are covered. Currently, an electronic device product, especially an electronic device of a metal industry design (industry design, ID), still requires very high structural compactness and a metal proportion, while a recent electronic device design trend is a higher screen-to-body ratio, more multimedia devices, and a larger battery capacity. These designs cause antenna space to be sharply compressed. This brings a severe challenge to an antenna design of a metal body terminal.

In the conventional technology, on an electronic device with a metal frame and a glass battery cover ID, a conventional design scheme of a MIMO antenna, for example, a MIMO antenna of a low band (Low Band, LB) frequency band (which may also be referred to as an LB MIMO antenna), generally means to design a plurality of low-frequency antennas on a metal frame. In addition, considering that a frequency band of the MIMO antenna is usually the same as a frequency band of an original communication antenna, isolation of an antenna system is prone to deterioration, and a distance between two adjacent low-frequency antennas is usually designed to be large, to achieve good isolation.

However, in the foregoing scheme, the low-frequency antenna occupies an excessively large design area on the metal frame of the electronic device, which is unfavorable to layout of another antenna.

SUMMARY

Embodiments of this application provide an antenna apparatus and an electronic device, to reduce a layout area on a metal frame, and reduce impact on another antenna.

A first aspect of embodiments of this application provides an antenna apparatus, where the antenna apparatus is configured for an electronic device, the electronic device includes a middle frame, a battery cover, and a battery located between the middle frame and the battery cover, and the antenna apparatus includes: at least one group of coupling feeding elements and at least one group of radiation elements, where each group of radiation elements includes:

a first radiator and a second radiator, where the first radiator and the second radiator are arranged on an inner surface of the battery cover; and the first radiator and the second radiator are respectively located on two sides of the coupling feeding element, and the coupling feeding element is separately coupled to and feeds the first radiator and the second radiator.

Embodiments of this application provide an antenna apparatus. The antenna apparatus includes at least one group of coupling feeding elements and at least one group of radiation elements. A first radiator and a second radiator in the at least one group of radiation elements are arranged on an inner surface of a battery cover. The first radiator and the second radiator are respectively located on two sides of the coupling feeding element, and the coupling feeding element is separately coupled to and feeds the first radiator and the second radiator, so that distributed feeding connection between the coupling feeding element and the radiation element may be implemented. In this way, double resonance may be excited to implement wide frequency band coverage. Most of a feeding network may be implemented through a radiator arranged on the inner surface of the battery cover, so that a layout area of an antenna on a metal frame may be reduced, and impact on another antenna may be reduced. In addition, the antenna apparatus may be implemented in limited design space. This effectively saves antenna design space inside an electronic device to some extent.

In a possible implementation, at least one of the first radiator and the second radiator is located between orthographic projection of one side frame of the middle frame and the battery towards the battery cover.

In other words, at least one of the first radiator and the second radiator is located between the side frame (a left side frame or a right side frame) and an outer edge of the battery (an outer edge of the battery close to a side of the side frame). In this way, if at least one of the first radiator and the second radiator is not located in an orthographic projection area of the battery towards the battery cover, the battery does not block the first radiator or the second radiator. This avoids impact or interference on radiation performance of the first radiator or the second radiator.

In a possible implementation, the first radiator is located between the orthographic projection of one side frame of the middle frame and the battery towards the battery cover, and the second radiator is located between the orthographic projection of another opposite side frame of the middle frame and the battery towards the battery cover.

In this way, both the first radiator and the second radiator are located between the side frame (the left side frame or the right side frame) and the outer edge of the battery (the outer edge of the battery close to the side of the side frame). In other words, neither the first radiator nor the second radiator is located in the orthographic projection area of the battery towards the battery cover, and the battery does not block the first radiator and the second radiator. This avoids the impact or interference on the radiation performance of the first radiator and the second radiator.

In a possible implementation, the apparatus further includes at least two metal frame antennas, where two of the at least two metal frame antennas are low-frequency antennas.

Using some metal frames of the electronic device as a radiator in the antenna apparatus helps further improve radiation performance of the antenna apparatus.

In a possible implementation, one end of the first radiator extends toward a top frame of the middle frame, and one end of the second radiator extends toward a bottom frame of the middle frame; an orthographic projection of one low-frequency antenna towards the battery cover is opposite to the first radiator, and the orthographic projection of the one low-frequency antenna towards the battery cover and the first radiator are respectively located on two sides of the orthographic projection of the battery towards the battery cover; and an orthographic projection of another low-frequency antenna towards the battery cover is opposite to the second radiator, and the orthographic projection of another low-frequency antenna towards the battery cover and the second radiator are respectively located on the two sides of the orthographic projection of the battery towards the battery cover.

The first radiator is arranged diagonally opposite to the second radiator, the first radiator is arranged opposite to one low-frequency antenna along a central axis in a length direction of the frame, and the second radiator is arranged opposite to another low-frequency antenna along the central axis in the length direction of the frame. One low-frequency antenna is arranged diagonally opposite to another low-frequency antenna. In this way, both the radiator (the first radiator or the second radiator) and the metal frame antennas (the two low-frequency antennas) are separately arranged, so that the radiator (the first radiator or the second radiator) is far away from the metal frame antennas in terms of spatial positions, and isolation between the first radiator and the metal frame antennas and between the second radiator and the metal frame antennas may be increased. In this way, an isolation effect between antenna modules in the antenna apparatus may be effectively improved, and further, it may be ensured that the first radiator and the second radiator do not cause interference to the metal frame antennas (the two low-frequency antennas).

In a possible implementation, one end of the first radiator extends toward a bottom frame of the middle frame, and one end of the second radiator extends toward the bottom frame of the middle frame; or one end of the first radiator extends toward a top frame of the middle frame, and one end of the second radiator extends toward the top frame of the middle frame; or one end of the first radiator extends toward a bottom frame of the middle frame, and one end of the second radiator extends toward a side frame of the middle frame.

In a possible implementation, an electrical length of the first radiator and an electrical length of the second radiator range from $\frac{1}{4}\lambda$ to $\frac{1}{2}\lambda$, where $\lambda$ is a wavelength corresponding to a resonant frequency of each of the first radiator and the second radiator.

In a possible implementation, each group of coupling feeding elements includes: a first coupling feeding element and a second coupling feeding element, where the first coupling feeding element is electrically connected to a feed, and the first coupling feeding element is separately coupled to and feeds another end of the first radiator and one end of the second coupling feeding element; and another end of the second coupling feeding element is coupled to and feeds another end of the second radiator.

In this way, the external feed feeds the first coupling feeding element, the first coupling feeding element is separately coupled to and feeds the first radiator and the second coupling feeding element, and then the second coupling feeding element is coupled to and feeds the second radiator. In this way, a process of feeding the first radiator and the second radiator through the feed is implemented.

In a possible implementation, the first coupling feeding element includes: a bracket and a feeding branch arranged on the bracket, where the feeding branch is electrically connected to the feed; and the bracket is fixed on the inner surface of the battery cover.

The bracket is fixed on the inner surface of the battery cover, so that the first coupling feeding element may be fixed. The feeding branch is electrically connected to the feed, so that the feed may feed the first coupling feeding element. The first coupling feeding element is separately coupled to and feeds the first radiator and the second coupling feeding element, and then the second coupling feeding element is coupled to and feeds the second radiator, to implement a process of feeding the first radiator and the second radiator through the feed.

In a possible implementation, the second coupling feeding element, the first radiator, and the second radiator are floating metals, graphene layers, or transparent conductive layers.

In a possible implementation, an operating frequency band of the first radiator and an operating frequency band of the second radiator range from 700 MHz to 900 MHz.

In a possible implementation, the apparatus further includes: at least one group of coupling grounding elements, where each group of coupling grounding elements includes at least two coupling ground layers, where one coupling ground layer is arranged close to one end of the first radiator and is coupled to and grounded with the first radiator; and another coupling ground layer is arranged close to one end of the second radiator and is coupled to and grounded with the second radiator.

In this way the first radiator may be coupled to and grounded with the middle frame through the coupling ground layer close to the first radiator, and the second radiator may be coupled to and grounded with the middle frame through the coupling ground layer close to the second radiator.

A second aspect of embodiments of this application provides an electronic device, including at least a display screen, a middle frame, a battery cover, and a battery located between the middle frame and the battery cover, and further including any one of the foregoing antenna apparatuses, where all the first radiator, the second radiator, and the coupling feeding element in the antenna apparatus are arranged on an inner surface of the battery cover.

Embodiments of this application provide an electronic device. The foregoing antenna apparatus is arranged in the electronic device. Because the antenna apparatus may reduce a layout area of an antenna on a metal frame, impact on another antenna may be reduced, and the antenna apparatus may be implemented in limited design space. To some extent, antenna design space inside the electronic device is effectively saved, and the antenna apparatus is arranged in the electronic device. In this way, while a function of the electronic device is enhanced, an occupied size of the antenna apparatus in the electronic device may be reduced, so that effective space for mounting another component in the electronic device is provided, and an experience effect of the electronic device is optimized. In addition, stability of signal transmission in the electronic device is ensured, and normal operation of the electronic device is ensured.

In a possible implementation, the middle frame is a metal middle frame, the metal middle frame includes at least a metal flame, and the metal frame forms at least two metal frame antennas in the antenna apparatus.

At least two metal frame antennas in the antenna apparatus formed by some metal frames of the electronic device are used as radiators, which helps further improve radiation performance of the antenna apparatus in the electronic device.

A third aspect of embodiments of this application further provides an electronic device, where the electronic device includes: at least a metal middle frame, a battery cover, and a battery located between the metal middle frame and the battery cover, and further includes: an antenna apparatus, where the antenna apparatus includes: a coupling radiation element, a feeding element, and at least three low-frequency antennas formed by a metal frame of the metal middle frame; and the coupling radiation element is arranged close to one of the low-frequency antennas, one end of the feeding element is coupled to and feeds the coupling radiation element, and another end of the feeding element feeds one of the low-frequency antennas.

Embodiments of this application provide an electronic device, At least three low-frequency antennas are formed through a metal frame of a metal middle frame, a coupling radiation element in an antenna apparatus is arranged close to one of the low-frequency antennas, and one end of a feeding element in the antenna apparatus is coupled to and feeds the coupling radiation element. Another end of the feeding element feeds one of the at least three low-frequency antennas. In this way, distributed feeding may be implemented by feeding and being connected to a metal frame antenna through the coupling radiation element. This improves radiation performance of the antenna apparatus. In addition, design difficulty of the entire antenna apparatus may be reduced to some extent.

In a possible implementation, the coupling radiation element includes: at least one coupling radiator, and the coupling radiator is arranged on an inner surface of the battery cover; and the coupling radiation element is arranged between the coupling radiator and the low-frequency antenna, one end of the feeding element is coupled to and feeds the coupling radiator, and another end of the feeding element feeds the low-frequency antenna.

In a possible implementation, at least some coupling radiators are located between orthographic projection of one side frame of the middle frame and the battery towards the battery cover.

In other words, a part or all of the structure of the coupling radiator is located between the side frame (a left side frame or a right side frame) and an outer edge of the battery (an outer edge of the battery close to a side of the side frame). In this way, a part or all of the structure of the coupling radiator is not located in an orthographic projection area of the battery towards the battery cover. In this case, the battery does not block the coupling radiator or may block only a part of the structure of the coupling radiator. This avoids impact or interference on radiation performance that blocks the coupling radiator.

In a possible implementation, the feeding element is electrically connected to a feed, one end of the feeding element is coupled to and feeds the coupling radiator, and another end of the feeding element is electrically connected to the low-frequency antenna through a feeding cable, so that the feeding element feeds the low-frequency antenna.

In this way, an external feed feeds the feeding element, the feeding element is coupled to and feeds the coupling radiator, and the feeding element feeds the low-frequency antenna through a feeding cable. In this way, a process of feeding the coupling radiator and the low-frequency antenna through the feed is implemented.

In a possible implementation, the feeding element includes: a bracket and a feeding branch arranged on the bracket, where the feeding branch is electrically connected to the feed; and the bracket is fixed on the inner surface of the battery cover.

The bracket is fixed on the inner surface of the battery cover, so that the feeding element may be fixed. The feeding branch is electrically connected to the feed, so that the external feed may feed the feeding element. The feeding element is coupled to and feeds the coupling radiator, and the feeding element feeds the low-frequency antenna through the feeding cable, to implement a process of feeding the coupling radiator and the low-frequency antenna through the feed.

In a possible implementation, the coupling radiation element or the feeding element is a floating metal, a graphene layer, or a transparent conductive layer.

In a possible implementation, the electronic device further includes: at least one ground layer, where the ground layer is arranged close to one end of the coupling radiator and is coupled to and grounded with the coupling radiator; and the ground layer is further grounded to the low-frequency antenna through the feeding cable.

In this way, a first radiator may be coupled to and grounded with the middle frame through a coupling ground layer close to the first radiator. The coupling radiator may be coupled to and grounded with the middle frame through the ground layer close to the coupling radiator, and the low-frequency antenna may be grounded to the middle frame.

With reference to the accompanying drawings, these and other aspects, implementation forms, and advantages of example embodiments will become apparent based on embodiments described below. However, it should be understood that the specification and the accompanying drawings are merely intended for descriptions and are not intended as definitions of limitations on embodiments of this application. For details, refer to the appended claims. Other aspects and advantages of embodiments of this application are described in the following description, and some aspects are obvious from the description or learned from practices of embodiments of this application. In addition, the aspects and advantages of embodiments of this application may be achieved and obtained by means and combinations specifically pointed out in the appended claims.

DESCRIPTIONS OF REFERENCE NUMERALS

100—antenna apparatus; 10—coupling feeding element; 101—first coupling feeding element; 102—second coupling feeding element; 20—radiation element; 201—first radiator; 202—second radiator; 30—metal frame antenna; 40—coupling grounding element; 401—coupling ground layer; 50—coupling radiation element; 60—feeding element; 70—printed circuit board; 200—mobile phone; 21—display screen; 211—opening; 22—middle frame; 221—metal middle plate; 222—frame; 2221—top frame, 2222—bottom frame; 2223—left side frame; 2224—right side frame; 23—circuit board; 24—battery; 25—battery cover; **26*a*—front camera module; and 26*b***—rear camera module.

DESCRIPTION OF EMBODIMENTS

The terms used in embodiments of this application are only used to explain specific embodiments of this application, and are not intended to limit this application. The following will describe the implementations of embodiments of this application in detail with reference to the accompanying drawings.

Embodiments of this application provide an electronic device, which may include but is not limited to a fixed or mobile terminal with an antenna such as a mobile phone, a tablet computer, a notebook computer, an ultra-mobile personal computer (ultra-mobile personal computer, UMPC), a handheld computer, a walkie-talkie, a netbook, and a point of sales (Point of sales, POS) machine, a personal digital assistant (personal digital assistant, PDA), a wearable device, a virtual reality device, a wireless USB Flash drive, a Bluetooth audio/headset, or a vehicle-mounted front-mounted device, a car recorder, and a security device.

Figure 1:
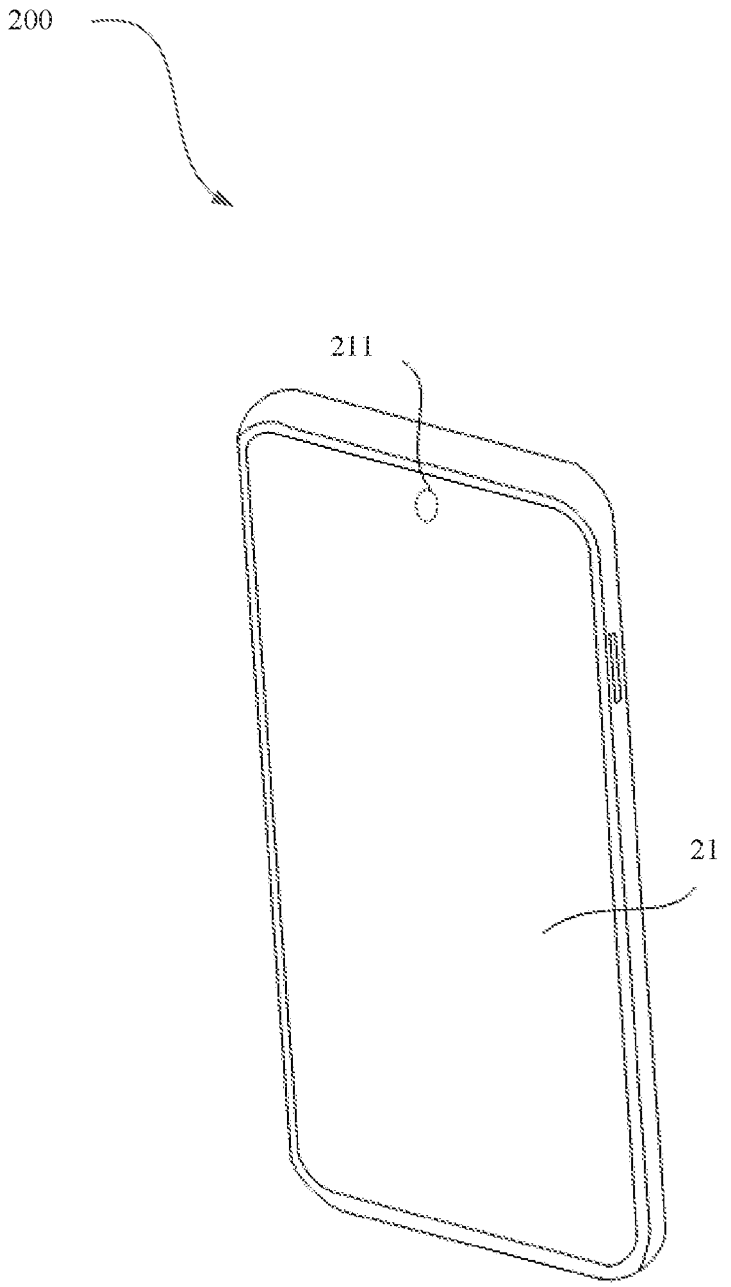
FIG. 1 is a schematic diagram of an overall structure of an electronic device according to an embodiment of this application.
Figure 2:
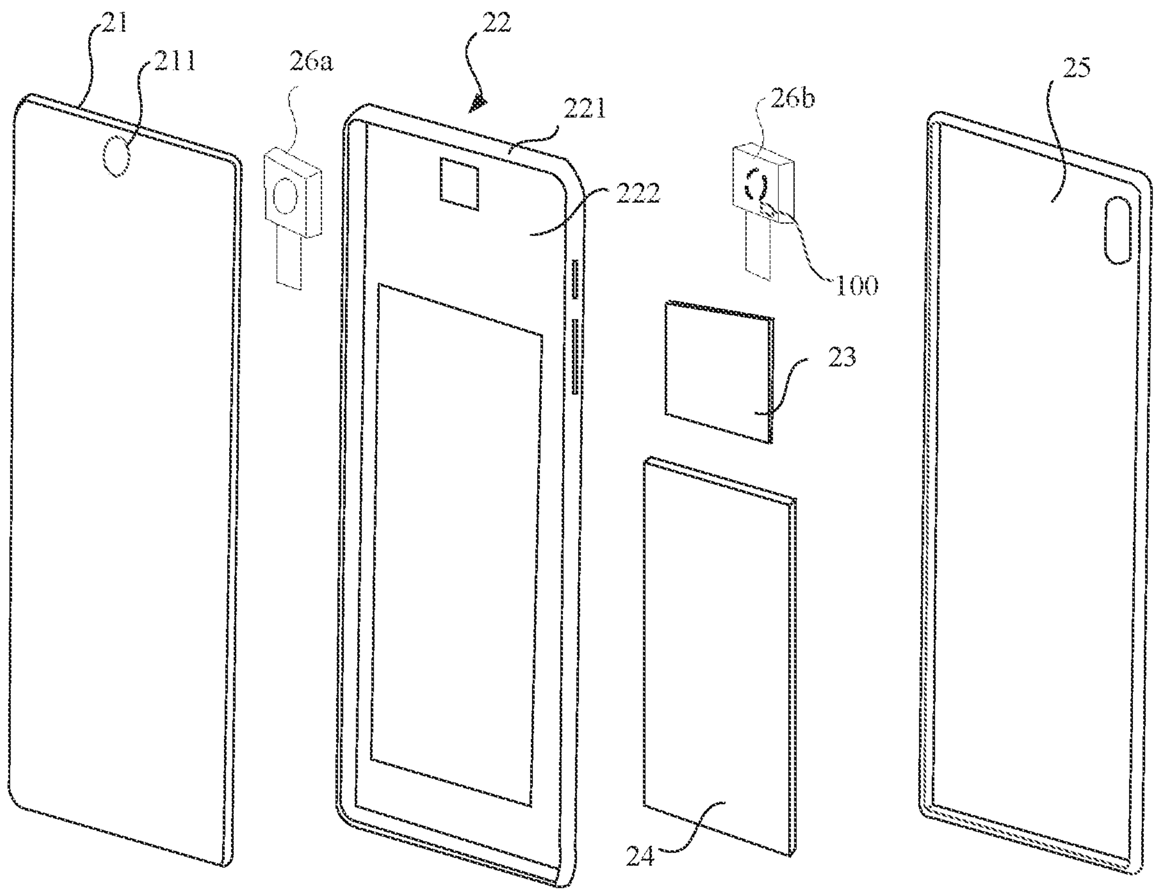
FIG. 2 is a schematic diagram of a split structure of an electronic device according to an embodiment of this application.

In embodiments of this application, a description is made by using an example in which a mobile phone 200 is the foregoing electronic device. The mobile phone 200 provided in embodiments of this application may be a curved-screen mobile phone or may be a flat-screen mobile phone. In embodiments of this application, a description is made by using an example of the flat-screen mobile phone. FIG. 1 and FIG. 2 respectively show an overall structure and a split structure of the mobile phone 200. A display screen 21 of the mobile phone 200 provided in embodiments of this application may be a water drop screen, a bang screen, a bezel-less screen, or a hole-cut screen (referring to FIG. 1). A description is made below by using an example of the hole-cut screen.

Referring to FIG. 2, the mobile phone 200 may include: a display screen 21, a middle frame 22, a battery cover 25, and a battery 24 located between the middle frame 22 and the battery cover 25. The battery 24 may be arranged on a surface that is of the middle frame 22 and that faces the battery cover 25 (as shown in FIG. 2). Alternatively, the battery 24 may be arranged on a surface that is of the middle frame 22 and that faces the display screen 21. For example, the surface that is of the middle frame 22 and that faces the battery cover 25 may have a battery compartment (not shown in the figure), and the battery 24 is mounted in the battery compartment. In some other examples, the mobile phone 200 may further include a circuit board 23, where the circuit board 23 may be arranged on the middle frame 22. For example, the circuit board 23 may be arranged on the surface that is of the middle frame 22 and that faces the battery cover 25 (as shown in FIG. 2). Alternatively, the circuit board 23 may be arranged on the surface that is of the middle frame 22 and that faces the display screen 21, and the display screen 21 and the battery cover 25 are respectively located on two sides of the middle frame 22.

The battery 24 may be connected to a charging management module and the circuit board 23 through a power management module. The power management module receives input from the battery 24 and/or the charging management module, and supplies power to a processor, an internal memory, an external memory, the display screen 21, a camera module, a communication module, and the like. The power management module may be further configured to monitor parameters such as a battery 24 capacity, a battery 24 cycle count, and a battery 24 state of health (leakage and impedance). In some other embodiments, the power management module may also be arranged in a processor of the circuit board 23. In some other embodiments, the power management module and the charging management module may further be configured in a same device.

When the mobile phone 200 is the flat-screen mobile phone, the display screen 21 may be an organic light-emitting diode (Organic Light-Emitting Diode, OLED) display screen, or may be a liquid crystal display (Liquid Crystal Display, LCD). When the mobile phone 200 is the curved-screen mobile phone, the display screen may be the OLED display screen.

Still referring to FIG. 2, the middle frame 22 may include a metal middle plate 221 and a frame 222, and the frame 222 is arranged surrounding an outer periphery of the metal middle plate 221. Generally, the frame 222 may include a top frame 2221, a bottom frame 2222, a left side frame 2223, and a right side frame 2224. The top frame 2221, the bottom frame 2222, the left side frame 2223, and the right side frame 2224 surround and form a frame 222 of a square ring structure. A material of the metal middle plate 221 includes but is not limited to an aluminum plate, an aluminum alloy, a stainless steel, a steel-aluminum composite die-casting plate, a titanium alloy, a magnesium alloy, or the like. The frame 222 may be a metal frame, a ceramic frame, or a glass frame. When the frame 222 is the metal frame, a material of the metal frame includes but is not limited to the aluminum alloy, the stainless steel, the steel-aluminum composite die-casting plate, the titanium alloy or the like. The metal middle plate 221 and the frame 222 may be clamped, welded, bonded, or integrally formed, or the metal middle plate 221 may be fixedly connected to the frame 222 by injection molding.

Referring to FIG. 2, the top frame 2221 is arranged opposite to the bottom frame 2222, the left side frame 2223 is arranged opposite to the right side frame 2224. The top frame 2221 is separately connected to one end of the left side frame 2223 and one end of the right side frame 2224 in a rounded manner. The bottom frame 2222 is separately connected to another end of the left side frame 2223 and another end of the right side frame 2224 in a rounded manner, to jointly form a rounded rectangular area. A rear housing grounding surface is arranged in the rounded rectangular area, and is separately connected to the top frame 2221, the bottom frame 2222, the left side frame 2223, and the right side frame 2224. It may be understood that the rear housing grounding surface may be the battery cover 25 of the mobile phone 200.

The battery cover 25 may be a metal battery cover, a glass battery cover, a plastic battery cover, or a ceramic battery cover. In embodiments of this application, a material of the battery cover 25 is not limited, and is not limited to the foregoing example.

It should be noted that in some examples, the battery cover 25 of the mobile phone 200 may be connected to the frame 222 to form an integrally formed (Unibody) battery cover. For example, the mobile phone 200 may include: the display screen 21, the metal middle plate 221, and the battery cover. The battery cover may be a battery cover integrally formed (Unibody) by the frame 222 and the battery cover 25. In this way, the circuit board 23 and the battery 24 are located in space enclosed by the metal middle plate 221 and the battery cover.

To implement a photographing function, the mobile phone 200 may further include: a camera module. Still referring to FIG. 2, the camera module may include a front camera module **26*a* and a rear camera module 26*b*. The rear camera module 26*b* may be arranged on a surface that is of the metal middle plate 221 and that faces the battery cover 25. An opening 211 is provided on the display screen 21, and a lens of the rear camera module 26*b* corresponds to the opening 211. A mounting hole (not shown in the figure) that may be mounted in a partial area of the rear camera module 26*b* may be provided on the battery cover 25. Certainly, the rear camera module 26*b* may also be mounted on a surface that is of the battery cover 25 and that faces the metal middle plate 221. The front camera module 26*a* may be arranged on a surface that is of the metal middle plate 221 and that faces the display screen 21, or the front camera module 26*a* may be arranged on a surface that is of the metal middle plate 221 and that faces the battery cover 25, or the front camera module 26*a* may be further arranged on the surface that is of the battery cover 25 and that faces the display screen 21, and an opening that may be exposed at a lens end of the front camera module 26*a* is provided on the metal middle plate 221**.

In embodiments of this application, arrangement positions of the front camera module **26*a* and the rear camera module 26*b* include but are not limited to the foregoing description. In some embodiments, there may be 1 or N front camera modules 26*a* and rear camera modules 26*b* arranged in the mobile phone 200**, where N is a positive integer greater than 1.

It may be understood that an example structure in embodiments of this application does not constitute a specific limitation on the mobile phone 200. In some other embodiments of this application, the mobile phone 200 may include more or fewer components than those shown in the figure, or some components may be combined, or some components may be split, or components are arranged in different manners. The components shown in the figure may be implemented by hardware, software, or a combination of software and hardware.

To further increase an implementable function of the mobile phone 200, an antenna may be arranged on the mobile phone 200. Currently, most electronic devices use an ID design of the metal frame and the glass rear cover. Because a size of the metal frame is limited and an antenna environment is tight, antennas of some frequency bands may only stimulate a single mode of the metal frame to minimize the size. Therefore, a bandwidth of the antenna designed by using the metal frame is narrow especially when the antenna is designed in a low-frequency band, and performance is greatly affected by hand holding. Currently, specifications of a low-frequency three-antenna and a low-frequency four-antenna are gradually put on the agenda. An added MIMO antenna continues to use a frame antenna design, and occupies a large layout area on a metal frame of a mobile phone. Therefore, space of other antennas is inevitably compressed, which greatly affects other antennas (such as medium and high frequency antennas). Therefore, it is urgent to find a novel MIMO antenna scheme that has little impact on other antennas.

Based on this, embodiments of this application provide an antenna apparatus. The antenna apparatus may be used in the foregoing electronic device (for example, the mobile phone 200), and a first radiator, a second radiator, and a coupling feeding element in the antenna apparatus are all arranged on an inner surface of a battery cover. Specifically, the antenna apparatus includes at least one group of coupling feeding elements and at least one group of radiation elements. A first radiator and a second radiator in the at least one group of radiation elements are arranged on an inner surface of a battery cover. The first radiator and the second radiator are respectively located on two sides of the coupling feeding element, and the coupling feeding element is separately coupled to and feeds the first radiator and the second radiator, so that distributed feeding connection between the coupling feeding element and the radiation element may be implemented. In this way, double resonance may be excited to implement wide frequency band coverage. Most of a feeding network may be implemented through a radiator arranged on the inner surface of the battery cover, so that a layout area of an antenna on a metal frame may be reduced, and impact on another antenna may be reduced. In addition, the antenna apparatus may be implemented in limited design space. This effectively saves antenna design space inside an electronic device to some extent.

It should be noted that the antenna apparatus provided in this application is configured for an electronic device that uses one or more of the following MIMO communication technologies: for example, a long term evolution (long term evolution, LTE) communication technology, a Wi-Fi communication technology, a 5G communication technology, a SUB-6G communication technology, and another future MIMO communication technology.

The following uses different embodiments as an example, and describes a specific structure of the antenna apparatus with reference to the accompanying drawings. (The following embodiments do not highlight a requirement of a communication network, and only describe an operating feature of the antenna apparatus by using a frequency value.)

EMBODIMENT 1

Figure 3A:
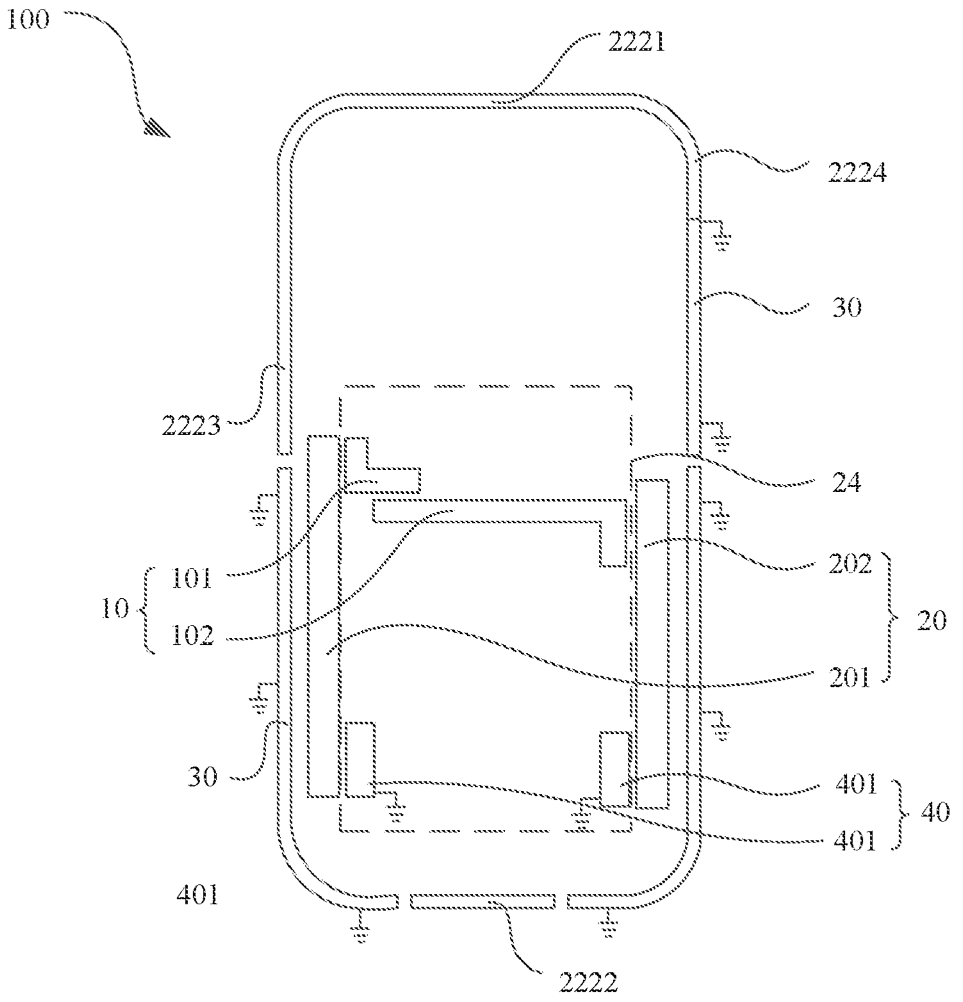
FIG. 3A is a schematic diagram of a structure of an antenna apparatus in an electronic device according to an embodiment of this application.

Embodiments of this application provide an antenna apparatus 100. The antenna apparatus 100 is configured for an electronic device. The electronic device (for example, a mobile phone 200) may include at least a middle frame 22, a battery cover 25, and a battery 24 (referring to FIG. 2) located between the middle frame 22 and the battery cover 25. As shown in FIG. 3A, the antenna apparatus 100 may include: at least one group of coupling feeding elements 10 and at least one group of radiation elements 20. Specifically, in embodiments of this application, each group of radiation elements 20 may include: a first radiator 201 and a second radiator 202. The first radiator 201 and the second radiator 202 may be arranged on an inner surface of the battery cover 25, and the first radiator 201 and the second radiator 202 may be respectively located on two sides of the coupling feeding element 10. In addition, the coupling feeding element 10 is separately coupled to and feeds the first radiator 201 and the second radiator 202.

To some extent, the antenna apparatus 100 may be implemented in limited design space. This effectively saves antenna design space inside the electronic device. In addition, a groove does not need to be additionally provided on the antenna apparatus 100 on a metal frame of the middle frame 22, so that an industrial design appearance of the electronic device is not affected, and hand holding impact may be effectively reduced.

The first radiator 201 and the second radiator 202 may be printed or pasted on the inner surface of the battery cover 25, or the first radiator 201 and the second radiator 202 may be embedded in the inner surface of the battery cover 25. A specific manner of arranging the first radiator 201 and the second radiator 202 on the inner surface of the battery cover 25 is not limited in embodiments of this application, and is not limited to the foregoing example. Certainly, in some other embodiments, the first radiator 201 and the second radiator 202 may alternatively be arranged on an outer surface of the battery cover 25. This is not limited in embodiments of this application.

It may be understood that in some embodiments, the antenna apparatus 100 provided in embodiments of this application may include a plurality of groups of radiation elements 20, to add more radiators. As a quantity of radiators increases, the antenna apparatus 100 may implement coverage of more modes.

In embodiments of this application, at least one of the first radiator 201 and the second radiator 202 may be located between an orthographic projection of one side frame of the middle frame 22 and the battery 24 towards the battery cover 25. In other words, at least one of the first radiator 201 and the second radiator 202 may be located between an outer edge of the side frame (a left side frame 2223 or a right side frame 2224) and an outer edge of the battery 24 (an outer edge of the battery 24 close to a side of the side frame). For example, referring to FIG. 3A, the first radiator 201 is located between the left side frame 2223 and the outer edge of the battery 24 close to the side of the left side frame 2223. In this way, at least one of the first radiator 201 and the second radiator 202 is located outside an orthographic projection area of the battery 24 towards the battery cover 25, and the battery 24 does not block the first radiator 201 or the second radiator 202. Further, influence or interference on radiation performance of the first radiator 201 or the second radiator 202 may be avoided.

Further, in some embodiments, the first radiator 201 may be located between the orthographic projection of one side frame of the middle frame 22 and the battery 24 towards the battery cover 25. The second radiator 202 may be located between the orthographic projection of another opposite side frame of the middle frame 22 and the battery 24 towards the battery cover 25. In other words, the first radiator 201 may be located between one of the side frames of the middle frame 22 and the outer edge of the battery 24 (the outer edge of the battery 24 close to the side of the side frame). The second radiator 202 may be located between another side frame opposite to the side frame of the middle frame 22 and another opposite outer edge of the battery 24 (another outer edge of the battery 24 close to the side of another side frame). For example, as shown in FIG. 3A, the first radiator 201 is located between the left side frame 2223 and the outer edge of the battery 24 close to a side of the left side frame 2223, and the second radiator 202 is located between the right side frame 2224 and the outer edge of the battery 24 close to a side of the right side frame 2224.

In this way, both the first radiator 201 and the second radiator 202 are located between the side frame (the left side frame 2223 or the right side frame 2224) and the outer edge of the battery 24 (the outer edge of the battery 24 close to the side of the side frame). In other words, neither the first radiator 201 nor the second radiator 202 are located in the orthographic projection area of the battery 24 towards the battery cover 25, and the battery 24 does not block the first radiator 201 and the second radiator 202. This avoids the impact or interference on the radiation performance of the first radiator 201 and the second radiator 202.

Alternatively, in some other embodiments, the first radiator 201 or the second radiator 202 may not be completely located between the side frame (the left side frame 2223 or the right side frame 2224) and the outer edge of the battery 24 (the outer edge of the battery 24 close to the side of the side frame). In other words, a part of the first radiator 201 or the second radiator 202 may also be located in the orthographic projection area of the battery 24 towards the battery cover 25, provided that it is ensured that not all of the first radiator 201 or the second radiator 202 are located in the orthographic projection area of the battery 24 towards the battery cover 25. In other words, in some examples, some areas of the first radiator 201 and the second radiator 202 may be located in the orthographic projection area of the battery 24 towards the battery cover 25. However, most areas of the first radiator 201 and the second radiator 202 are located outside the orthographic projection area of the battery 24 towards the battery cover 25.

The antenna apparatus 100 may further include: at least two metal frame antennas 30, and two of the at least two metal frame antennas 30 may be low-frequency antennas. For example, as Shown in FIG. 3A, the antenna apparatus 100 further includes two metal frame antennas 30, and both the two metal frame antennas 30 are low-frequency antennas. Using some metal frames of the electronic device as a radiator in the antenna apparatus 100 helps further improve radiation performance of the antenna apparatus 100.

It should be noted that in embodiments of this application, the middle frame 22 may be a metal middle frame, the metal middle frame includes at least a metal frame, and the metal frame forms at least two metal frame antennas 30 in the antenna apparatus 100. Specifically, the metal frame antenna 30 may be a radiator located on the metal frame, and a slot is provided on the metal frame to form the radiator. In other words, the metal frame antenna 30 is a groove antenna formed by providing a slot on the metal frame. The groove antenna may include a first part, a second part, and a third part that are separated by a slot, where a non-conductive material may be filled between the first part and the second part, between the second part and the third part, and between the third part and the first part.

In actual application, a position of the slot may be changed as required, and each slot may be filled with the non-conductive material (for example, plastic), to ensure appearance integrity of the metal frame. A providing position of the slot on the metal frame is flexibly set, so that appearance designs with different requirements may be implemented while antenna radiation performance is ensured, and product quality of the electronic device may be improved.

In embodiments of this application, an extension direction of the first radiator 201 and an extension direction of the second radiator 202 may include but are not limited to the following several possible implementations:

In a possible implementation, one end of the first radiator 201 may extend toward a bottom frame of the middle frame 22, and one end of the second radiator 202 may extend toward the bottom frame of the middle frame 22 (refer to FIG. 3, FIG. 43, FIG. 49, or FIG. 50).

In another possible implementation, one end of the first radiator 201 may extend toward a top frame of the middle frame 22, and one end of the second radiator 202 may extend toward the bottom frame of the middle frame 22 (refer to FIG. 13, FIG. 44, FIG. 46, or FIG. 48).

Figure 47:
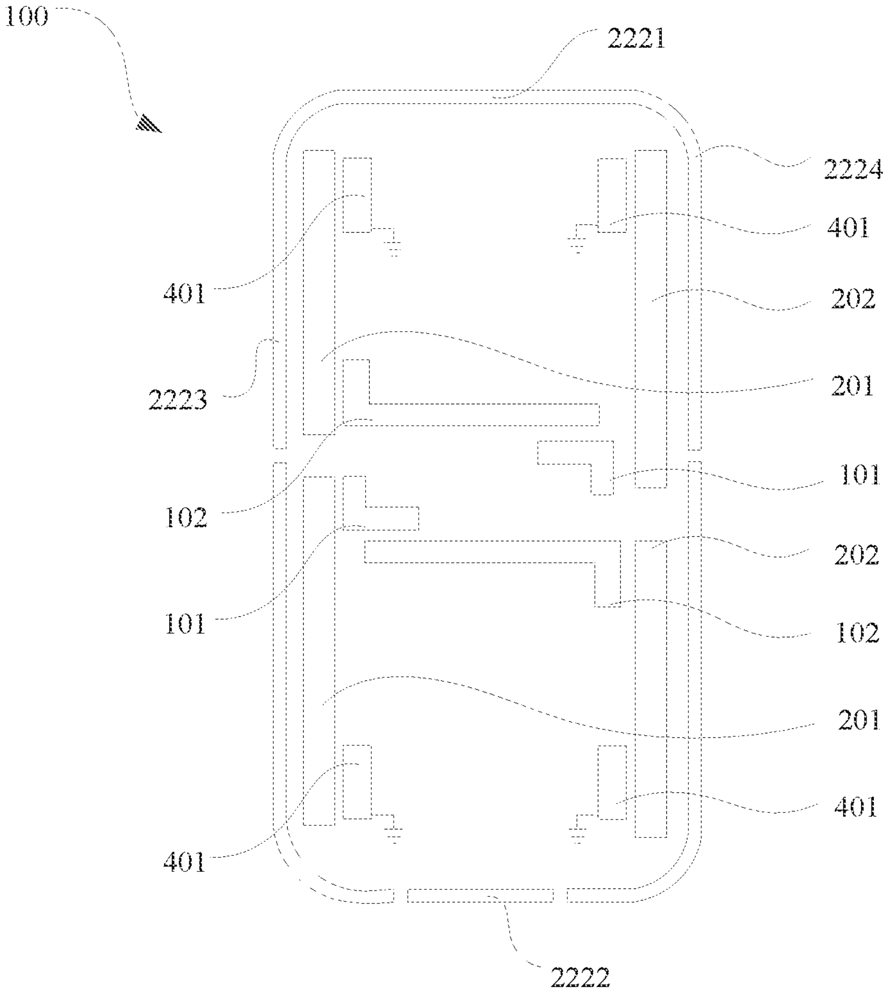
FIG. 47 is a schematic diagram of a structure of an antenna apparatus in an electronic device according to an embodiment of this application.
Figure 48:
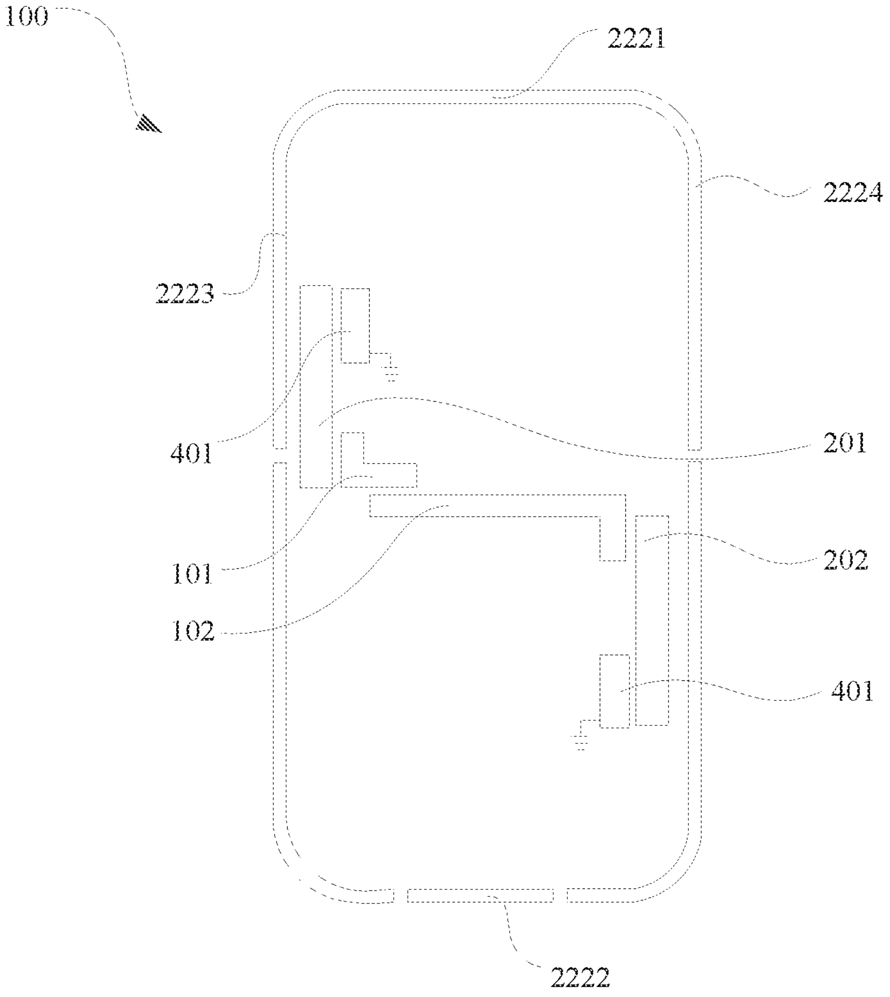
FIG. 48 is a schematic diagram of a structure of an antenna apparatus in an electronic device according to an embodiment of this application.
Figure 49:
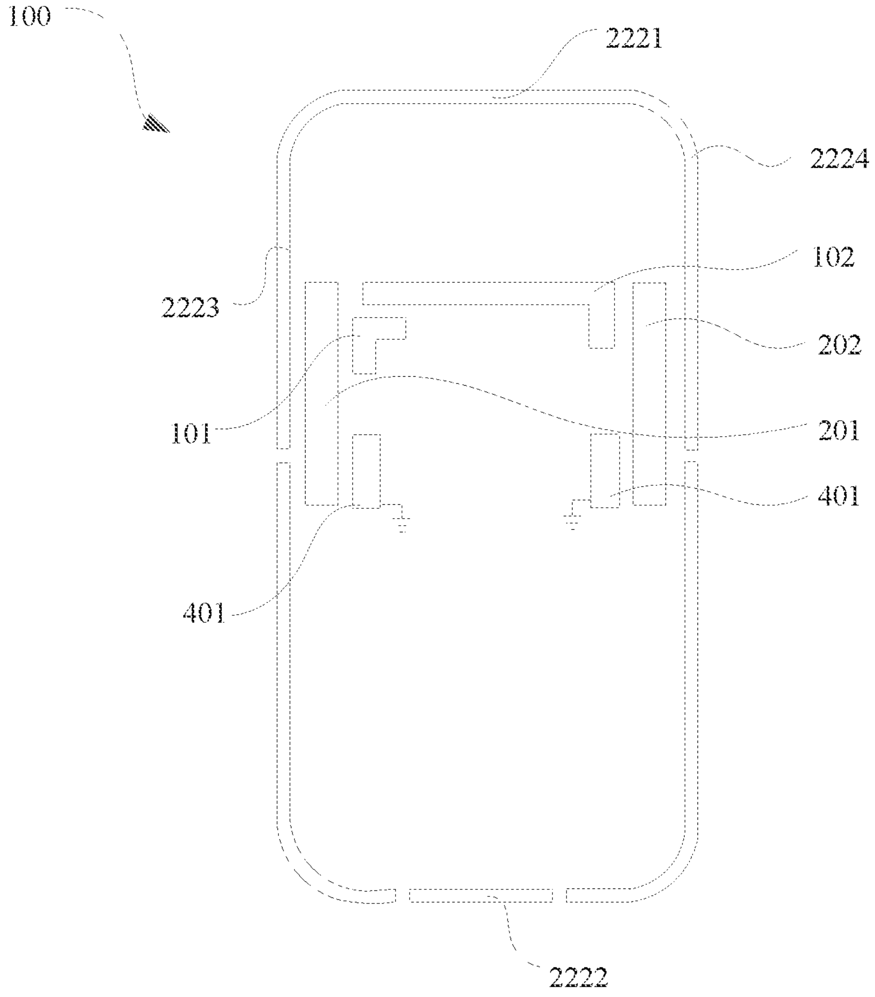
FIG. 49 is a schematic diagram of a structure of an antenna apparatus in an electronic device according to an embodiment of this application.
Figure 50:
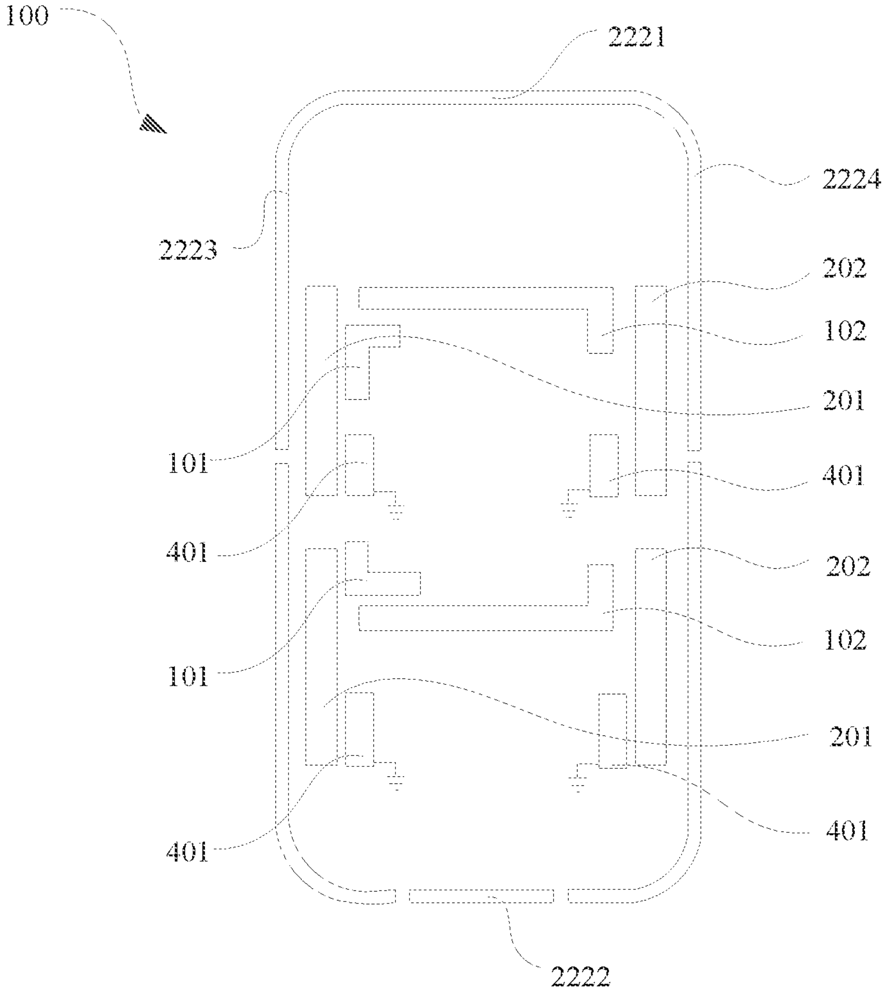
FIG. 50 is a schematic diagram of a structure of an antenna apparatus in an electronic device according to an embodiment of this application.

In still another possible implementation, one end of the first radiator 201 may extend toward the top frame of the middle frame 22, and one end of the second radiator 202 may extend toward the top frame of the middle frame 22 (refer to 31A or FIG. 47).

Figure 45:
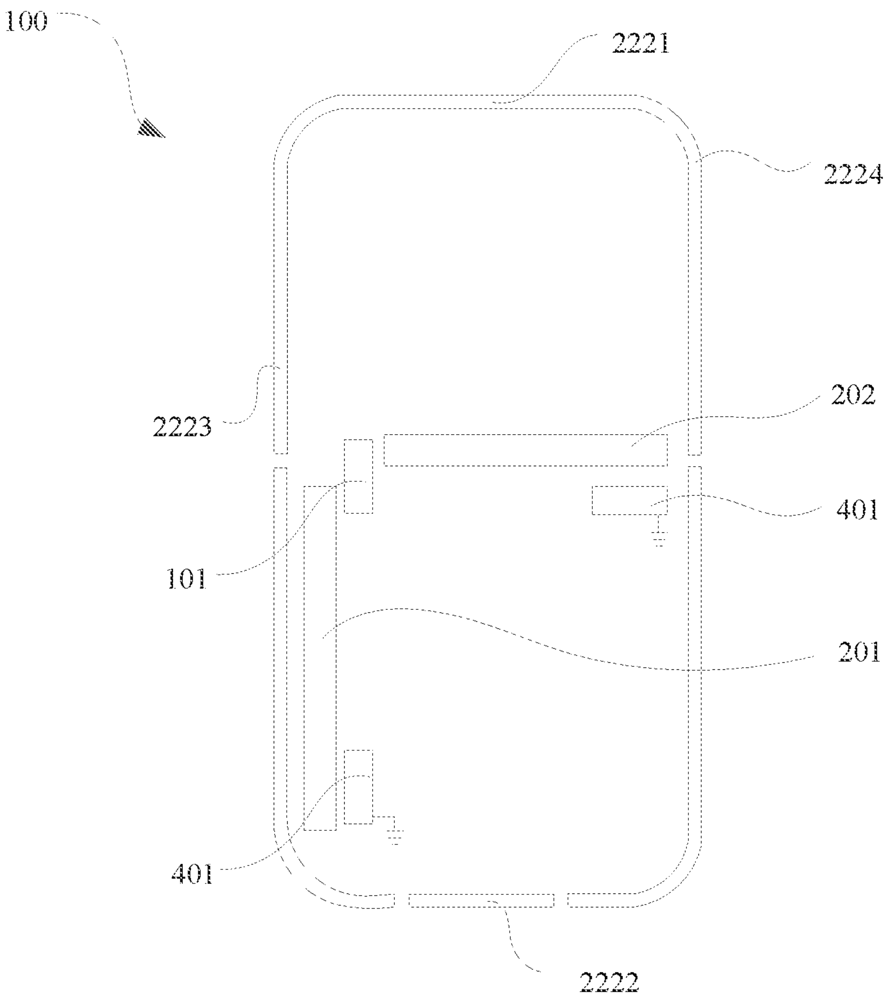
FIG. 45 is a schematic diagram of a structure of an antenna apparatus in an electronic device according to an embodiment of this application.
Figure 46:
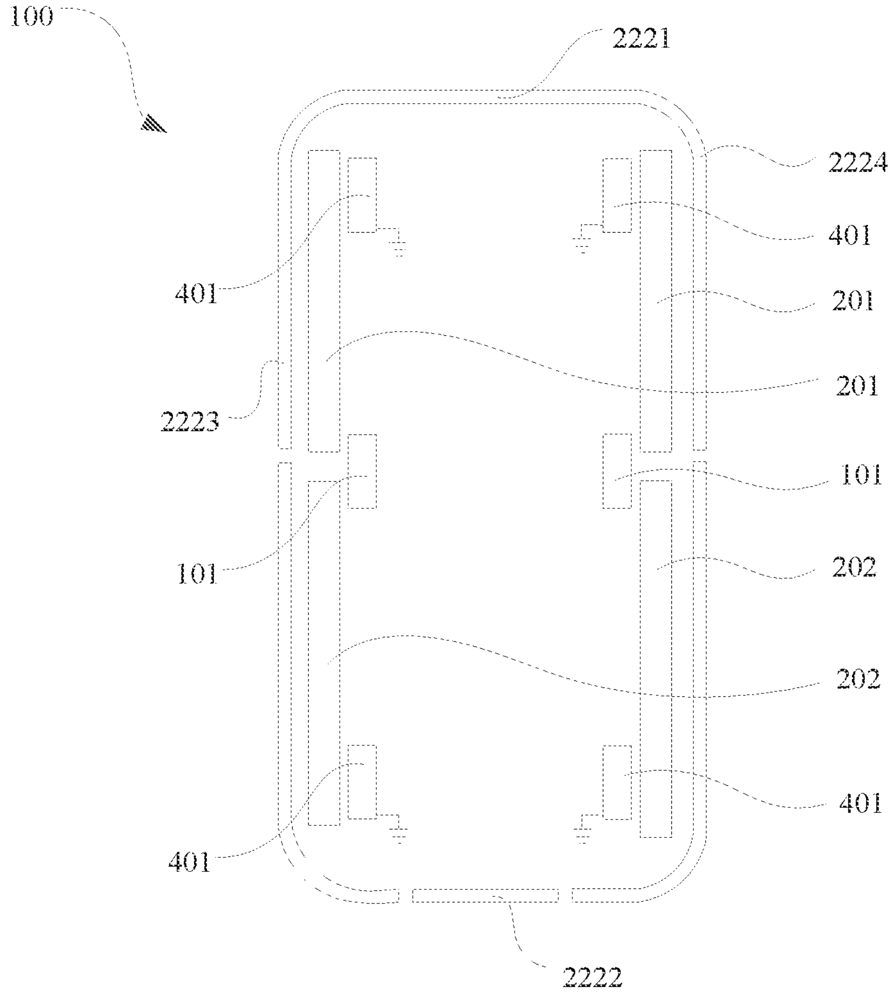
FIG. 46 is a schematic diagram of a structure of an antenna apparatus in an electronic device according to an embodiment of this application.

In yet another possible implementation, one end of the first radiator 201 may extend toward the bottom frame of the middle frame 22, and one end of the second radiator 202 may extend toward a side frame of the middle frame 22 (refer to FIG. 45).

Based on the foregoing description, in embodiments of this application, an electrical length of the first radiator 201 and an electrical length of the second radiator 202 may range from ¼λ to ½λ, where λ is a wavelength corresponding to a resonant frequency of the first radiator 201 and a wavelength corresponding to a resonant frequency of the second radiator 202. The electrical length of the first radiator 201 and the electrical length of the second radiator 202 are one quarter wavelength to one half wavelength corresponding to a required resonant frequency.

Further, with reference to FIG. 3A, each group of coupling feeding elements 10 may include: a first coupling feeding element 101 and a second coupling feeding element 102, where the first coupling feeding element 101 may be electrically connected to a feed. In addition, the first coupling feeding element 101 may be separately coupled to and feed another end of the first radiator 201 and one end of the second coupling feeding element 102, and another end of the second coupling feeding element 102 may be coupled to and feed another end of the second radiator 202. In this way, the external feed feeds the first coupling feeding element 101, the first coupling feeding element 101 is separately coupled to and feeds the first radiator 201 and the second coupling feeding element 102, and then the second coupling feeding element 102 is coupled to and feeds the second radiator 202. In this way, a process of feeding the first radiator 201 and the second radiator 202 through the feed is implemented.

In embodiments of this application, the first coupling feeding element 101 may include: a bracket (not shown in the figure) and a feeding branch (not shown in the figure) arranged on the bracket, where the feeding branch is electrically connected to the feed (or, the feeding branch may have a feeding point, and the feeding point is electrically connected to the feed), and the bracket may be fixed on the inner surface of the battery cover 25. The bracket is fixed on the inner surface of the battery cover 25, so that the first coupling feeding element 101 may be fixed. The feeding branch is electrically connected to the feed, so that the feed may feed the first coupling feeding element 101. The first coupling feeding element 101 is separately coupled to and feeds the first radiator 201 and the second coupling feeding element 102, and then the second coupling feeding element 102 is coupled to and feeds the second radiator 202, to implement a process of feeding the first radiator 201 and the second radiator 202 through the feed.

In addition, the feeding branch may also be directly a circuit layer arranged on the bracket, and the feeding branch may be directly formed and etched on the bracket by laser, to form a part that is fixed to the inner surface of the battery cover 25, and a part that is fixed to the first coupling feeding element 101 that is electrically connected to the external feed. It should be noted that if the feeding branch is implemented through a floating metal, the feeding branch may also be configured to cover another frequency band.

In an optional implementation, the bracket may be an insulating material. For example, the bracket may be any one or more of polycarbonate, acrylonitrile-butadiene-styrene copolymer, and a mixture PC/ABS material (for example, plastic). This is not limited in embodiments of this application, and is not limited to the foregoing example.

In a possible implementation, the coupling feeding element 10 (for example, the first coupling feeding element 101 and the second coupling feeding element 102) may also be arranged on the battery cover 25. In addition, there is a coupling spacing between the first coupling feeding element 101 and the second coupling feeding element 102, the second coupling feeding element 102 is coupled by the first coupling feeding element 101 in the air, and a coupling region may be formed between the second coupling feeding element 102 and the first coupling feeding element 101. It should be understood that the smaller the coupling spacing, the stronger the coupling effect. The larger the coupling distance, the weaker the coupling effect. The larger the coupling region, the stronger the coupling effect. The smaller the coupling region, the weaker the coupling effect. The coupling spacing and a specific value of the coupling region may be flexibly set based on an actual application requirement. This is not limited in embodiments of this application.

Still referring to FIG. 3A, the antenna apparatus 100 may further include: at least one group of coupling grounding elements 40, where each group of coupling grounding elements 40 may include at least two coupling ground layers 401. One coupling ground layer 401 is arranged close to one end of the first radiator 201 and is coupled to and grounded with the first radiator 201, and another coupling ground layer 401 is arranged close to one end of the second radiator 202 and is coupled to and grounded with the second radiator 202. The first radiator 201 may be coupled to and grounded with the middle frame 22 through the coupling ground layer 401 close to the first radiator 201, and the second radiator 202 may be coupled to and grounded with the middle frame 22 through the coupling ground layer 401 close to the second radiator 202.

It is easily understood that in embodiments of this application, one end of the coupling ground layer 401 may be connected to at least one of the first radiator 201 and the second radiator 202, and another end of the coupling ground layer 401 may be connected to a ground layer of the electronic device. Certainly, in some other embodiments, the first radiator 201 and the second radiator 202 may alternatively not use a coupling grounding structure, for example, may be directly grounded through the feeding cable. The feeding cable may be a wired able (for example, a cable), a transmission cable, or the like. A grounding structure of the antenna apparatus 100 is not limited in embodiments of this application, and is not limited to the foregoing example.

In embodiments of this application, the first radiator 201 and the second radiator 202 are low-frequency antennas. When the first radiator 201 and the second radiator 202 are used as the low-frequency antennas, an operating frequency band of the first radiator 201 and an operating frequency band of the second radiator 202 may be 700 MHz to 900 MHz. For example, the operating frequency band of the first radiator 201 and the operating frequency band of the second radiator 202 may be 700 MHz, 800 MHz, 900 MHz, or the like. This is not limited in embodiments of this application, and is not limited to the foregoing example.

Specifically, the first radiator 201 and the second radiator 202 may be arranged on the inner surface of the battery cover 25. Design space of the first radiator 201 and design space of the second radiator 202 on the inner surface of the battery cover 25 are sufficient, and a size of the first radiator 201 and a size of the second radiator 202 may be designed to be large. In this way, a coupling antenna design structure formed by the first radiator 201, the second radiator 202, and the coupling feeding element 10 may excite a resonant mode of a low-frequency band, generate more resonances, and implement coverage of more frequency bands. Alternatively, in some other embodiments, the size of the first radiator 201 and the size of the second radiator 202 included in the antenna apparatus 100 may be designed to be small, influence of surrounding components is reduced, and may be implemented in small design space.

In addition, in some embodiments, an example in which the first radiator 201 and the second radiator 202 are floating metal antennas is used. A filter, such as a band-pass filter or a high-frequency filter, may be further arranged inside the first radiator 201 and the second radiator 202. In this way, a signal radiated by a floating metal antenna may be filtered. In other words, a plurality of frequency bands may be implemented.

In embodiments of this application, the second coupling feeding element 102, the first radiator 201, and the second radiator 202 may be floating metals, graphene layers, or transparent conductive layers. The first radiator 201 may be configured to form a first MIMO antenna, and the second radiator 202 may be configured to form a second MIMO antenna. Certainly, in embodiments of this application, the second coupling feeding element 102, the first radiator 201, and the second radiator 202 include but are not limited to floating metal antennas, graphene antennas, and transparent antennas. For example, the first radiator 201 and the second radiator 202 that are arranged on the inner surface of the battery cover 25 may alternatively be other antenna elements that are arranged on the inner surface of the battery cover 25 and that may be coupled and radiate signals.

Figure 3B:
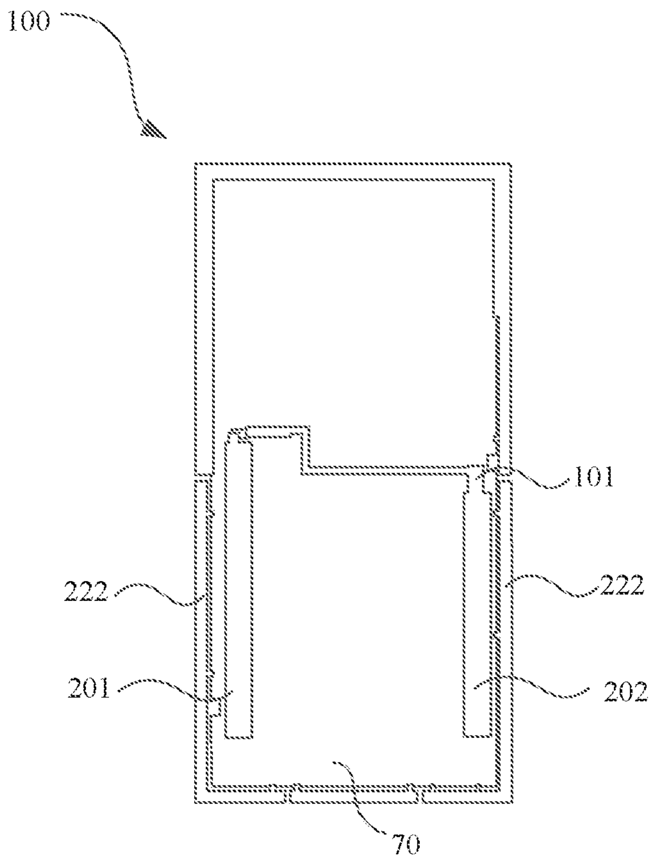
FIG. 3B is a simulation model diagram of an antenna apparatus in an electronic device according to an embodiment of this application.
Figure 3C:
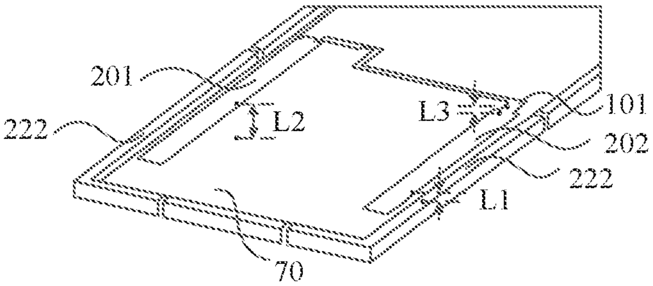
FIG. 3C is a simulation model diagram of an antenna apparatus in an electronic device according to an embodiment of this application.

FIG. 3B and FIG. 3C are simulation model diagrams of an antenna apparatus 100 according to an embodiment of this application. An example in which a second coupling feeding element 102, a first radiator 201, and a second radiator 202 are floating metals is used. Referring to FIG. 3C, a distance L1 between the first radiator 201 (namely, a first floating metal antenna) and a frame 222 (a metal frame) and a distance L1 between the second radiator 202 (namely, a second floating metal antenna) and the frame 222 (a metal frame) may range from 0.3 mm to 0.7 mm. An example in which a size of the electronic device having the antenna apparatus 100 is 158 mm*78 mm (referring to FIG. 3B) is used. A distance between the first floating metal antenna and the metal frame and a distance L1 between the second floating metal antenna and the metal frame may be 0.4 mm, 0.5 mm, 0.6 mm or the like. This is not limited in embodiments of this application, and is not limited to the foregoing example. A distance L2 between the first radiator 201 (namely, the first floating metal antenna) and a printed circuit board 70 and a distance L2 between the second radiator 202 (namely, the second floating metal antenna) and the printed circuit board 70 may range from 2.6 mm to 3.0 mm. For example, the distance between the first floating metal antenna and the printed circuit board 70 and the distance between the second floating metal antenna and the printed circuit board 70 may be 2.7 mm, 2.8 mm, 2.9 mm, or the like. This is not limited in embodiments of this application, and is not limited to the foregoing example. A distance L3 between a first coupling feeding element 101 (for example, a bracket in the first coupling feeding element 101) and the second radiator 202 (namely, the second floating metal antenna) may range from 0.1 mm to 0.5 mm. For example, the distance L3 between the first coupling feeding element 101 and the second floating metal antenna may be 0.2 mm, 0.3 mm, 0.5 mm, or the like. This is not limited in embodiments of this application, and is not limited to the foregoing example. In addition, in a possible implementation, in simulation model diagram of the antenna apparatus 100 shown in FIG. 3B, the frame 222 (the metal frame) in the antenna apparatus 100 is grounded and does not radiate.

Figure 4:
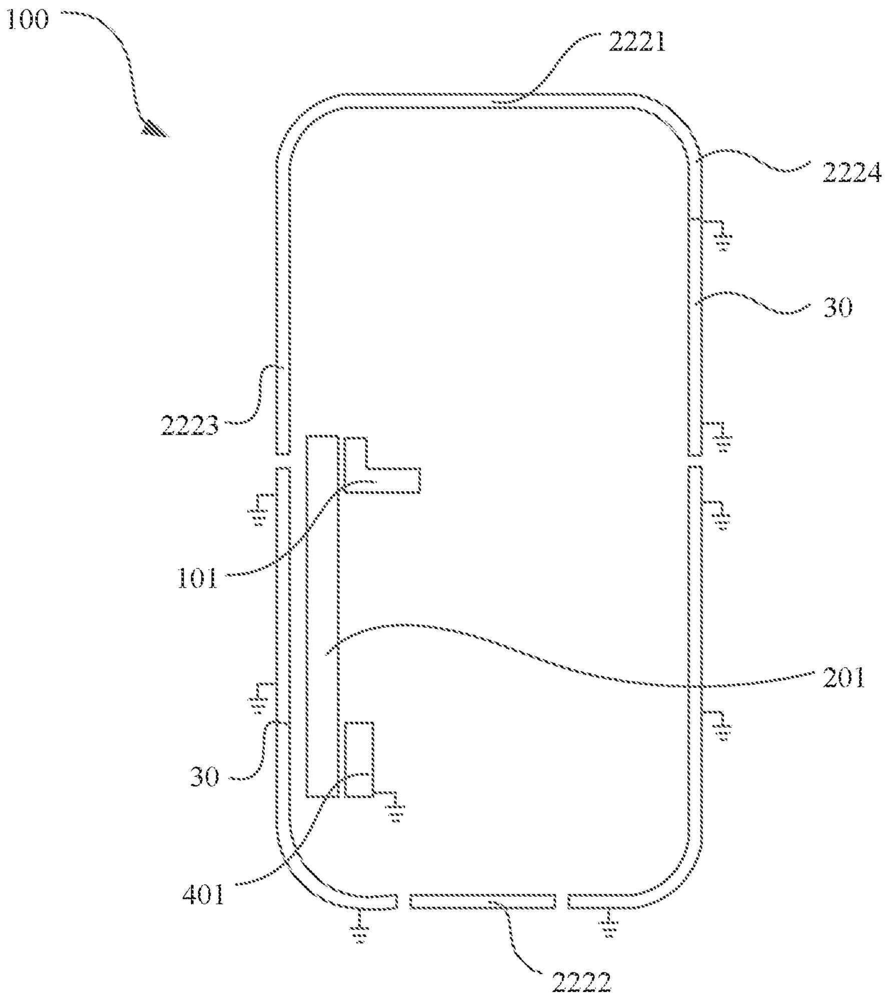
FIG. 4 is a schematic diagram of a structure of an antenna apparatus in an electronic device according to an embodiment of this application.
Figure 5:
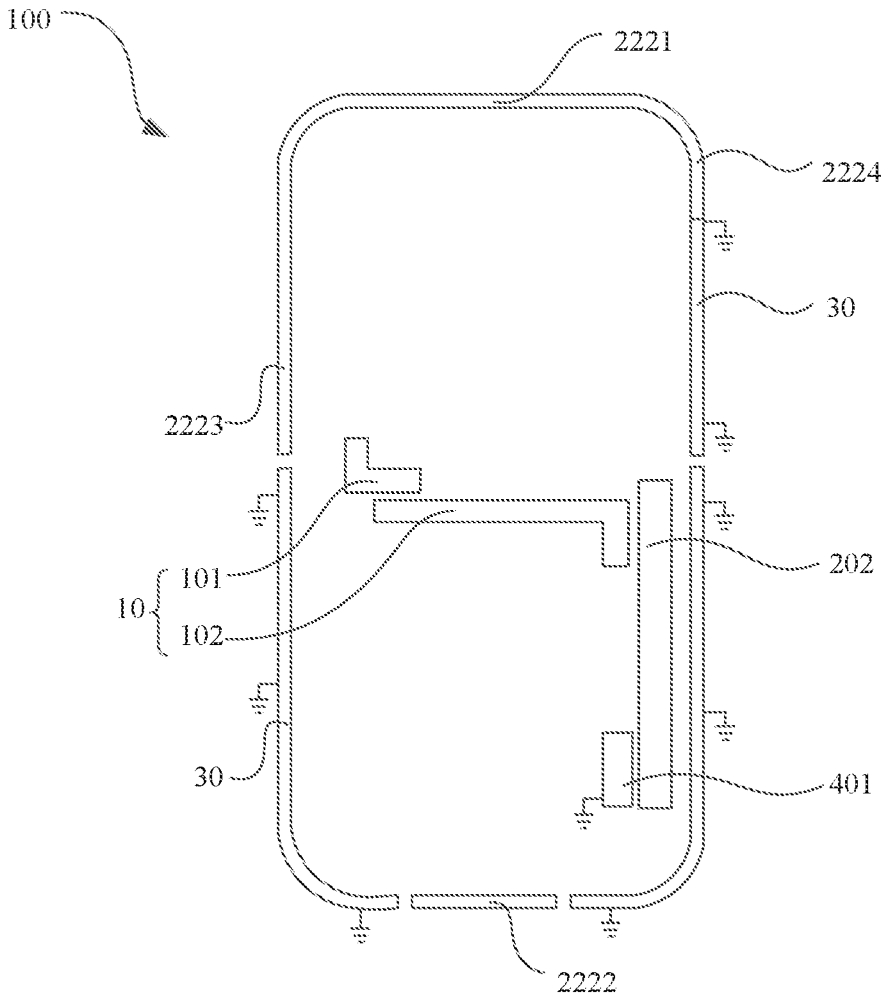
FIG. 5 is a schematic diagram of a structure of an antenna apparatus in an electronic device according to an embodiment of this application.
Figure 6:
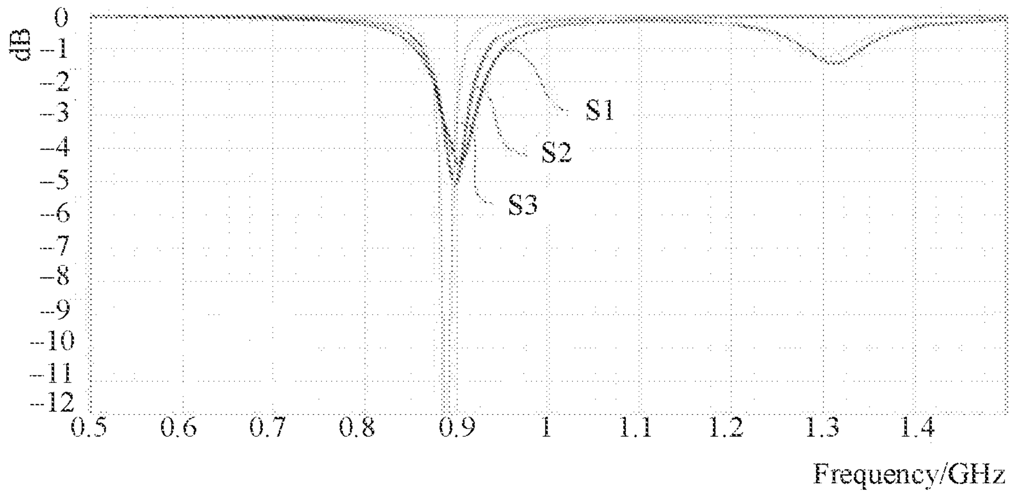
FIG. 6 is a performance comparison diagram of an antenna apparatus in an electronic device according to an embodiment of this application.
Figure 7:
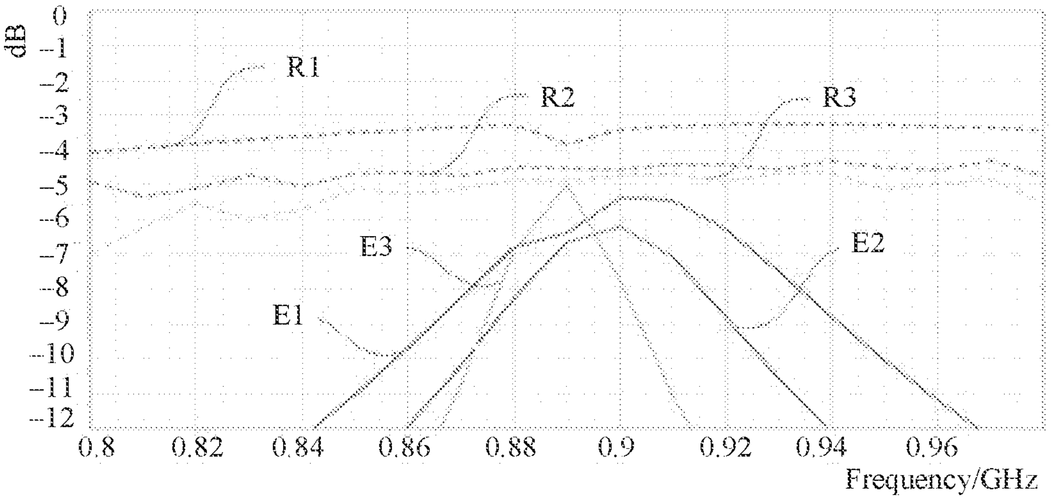
FIG. 7 is a performance comparison diagram of an antenna apparatus in an electronic device according to an embodiment of this application.

Based on the foregoing description, to further reflect advantages of the antenna apparatus 100, embodiments of this application further provide the antenna apparatus 100 whose radiation element 20 includes only the first radiator 201 (refer to FIG. 4) and the antenna apparatus 100 whose radiation element 20 includes only the second radiator 202 (refer to FIG. 5). In other words, FIG. 3 is a distributed radiator feeding structure. FIG. 4 is a left side single radiator feeding structure, and FIG. 5 is a right side single radiator feeding structure. FIG. 6 and FIG. 7 show performance comparison diagrams under the three antenna structures. Referring to FIG. 6, S1 shows a curve diagram of an antenna reflection coefficient changing with a frequency that corresponds to a distributed radiator feeding structure in free space (in a case that no interference is caused to the antenna apparatus 100). S2 shows a curve diagram of an antenna reflection coefficient changing with a frequency that corresponds to a left side single radiator feeding structure in free space. S3 shows a curve diagram of an antenna reflection coefficient changing with a frequency that corresponds to a right side single radiator feeding structure in free space. Referring to FIG. 7, E1 shows a curve diagram of system efficiency changing with a frequency that corresponds to a distributed radiator feeding structure in free space. E2 shows a curve diagram of system efficiency changing with a frequency that corresponds to a left side single radiator feeding structure in free space. E3 shows a curve diagram of system efficiency changing with a frequency that corresponds to a right side single radiator feeding structure in free space. R1 shows a curve diagram of radiation efficiency changing with a frequency that corresponds to a distributed radiator feeding structure in free space. R2 shows a curve diagram of radiation efficiency changing with a frequency that corresponds to a left side single radiator feeding structure in free space. R3 shows a curve diagram of radiation efficiency changing with a frequency that corresponds to a right side single radiator feeding structure in free space. It may be learned from the figure that compared with the single radiator feeding structure, the distributed radiator feeding structure improves the radiation efficiency by more than 1.5 dB, and a bandwidth (a bandwidth occupied by signals) of the distributed radiator feeding structure is about doubled.

Figure 8A:
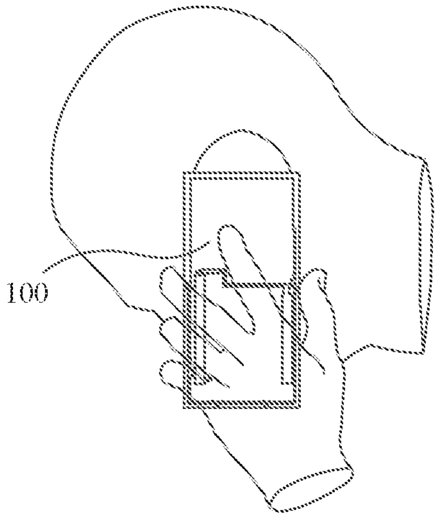
FIG. 8A is a diagram of an actual application scenario in which an antenna apparatus in an electronic device is held close to a left ear by using a left hand according to an embodiment of this application.
Figure 8B:
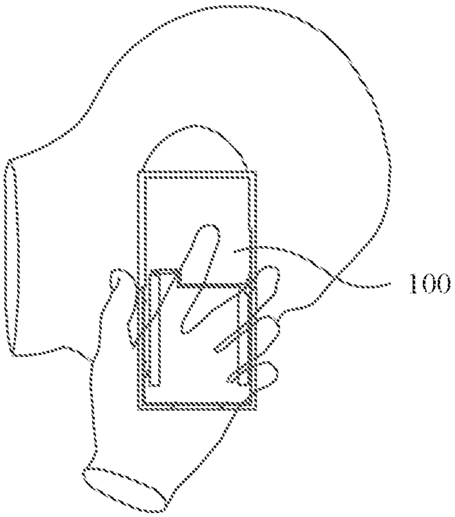
FIG. 8B is a diagram of an actual application scenario in which an antenna apparatus in an electronic device is held close to a right ear by using a right hand according to an embodiment of this application.
Figure 9:
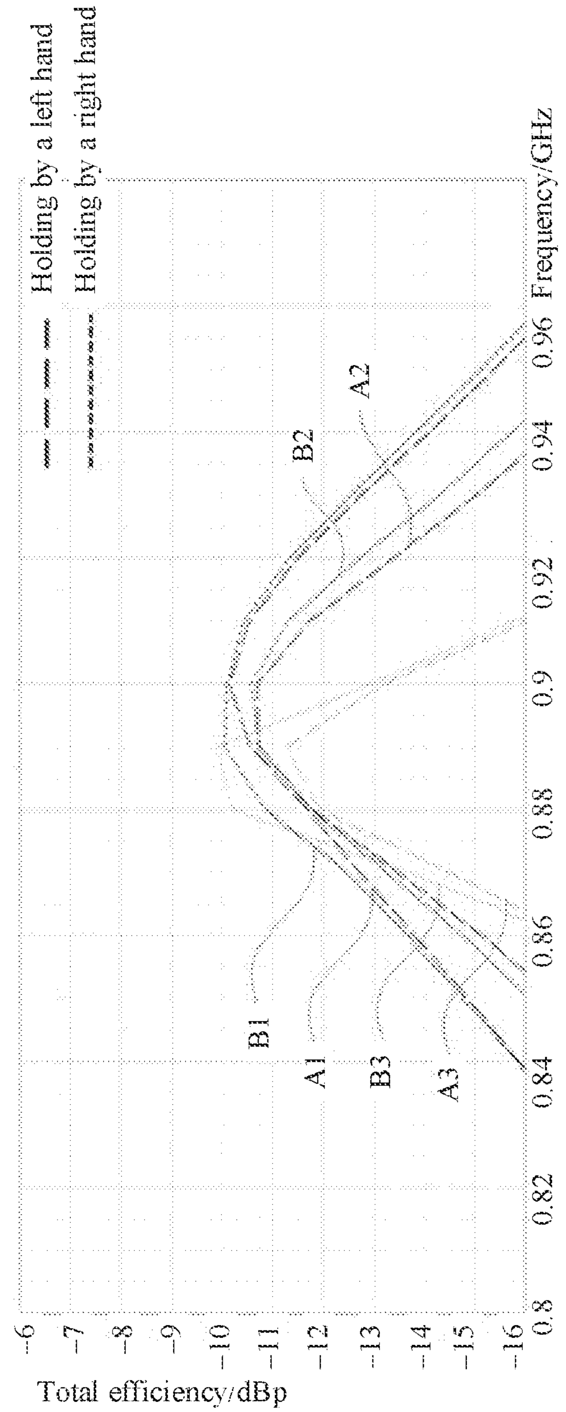
FIG. 9 is a performance comparison diagram of an antenna apparatus in an electronic device according to an embodiment of this application.
Figure 10:
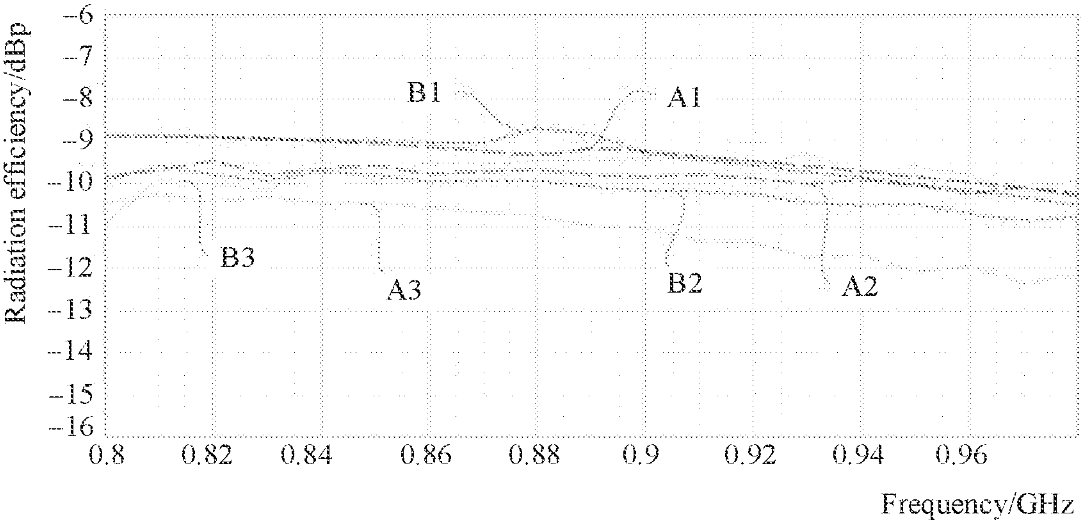
FIG. 10 is a performance comparison diagram of an antenna apparatus in an electronic device according to an embodiment of this application.

In addition, based on head-hand performance of the three antenna apparatuses 100 in an actual scenario, in other words, the electronic device such as the mobile phone 200 is held close to the head by hand, where the mobile phone 200 has an application evaluation of the antenna apparatus 100 that the mobile phone 200 is held close to a left ear by a left hand (refer to FIG. 8A), and the mobile phone 200 is held close to a right ear by a right hand (refer to FIG. 8B). As shown in FIG. 9 and FIG. 10, A1 shows a curve diagram corresponding to a distributed radiator feeding structure when a mobile phone 200 is held close to a left ear by a left hand. A2 shows a curve diagram corresponding to a left side single radiator feeding structure when a mobile phone 200 is held close to a left ear by a left hand. A3 shows a curve diagram corresponding to a right side single radiator feeding structure when a mobile phone 200 is held close to a left ear by a left hand. B1 shows a curve diagram corresponding to a distributed radiator feeding structure when a mobile phone 200 is held close to a right ear by a right hand. B2 shows a curve diagram corresponding to a left side single radiator feeding structure when a mobile phone 200 is held close to a right ear by a right hand. B3 shows a curve diagram corresponding to a right side single radiator feeding structure when a mobile phone 200 is held close to a right ear by a right hand. It may be learned from the figure that head-hand performance of the distributed feeding; structure is more balanced, and compared with the single feeding structure, the distributed feeding structure also has a better head-to-head performance efficiency bandwidth.

Figure 11A:
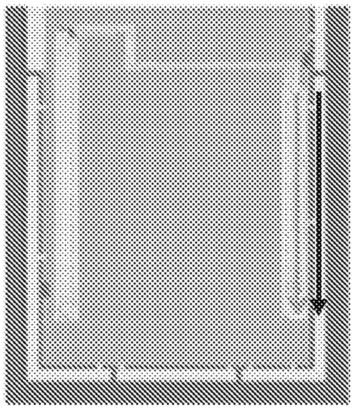
FIG. 11A is a current distribution diagram of an antenna apparatus at 0.88 GHz in an electronic device according to an embodiment of this application.
Figure 11B:
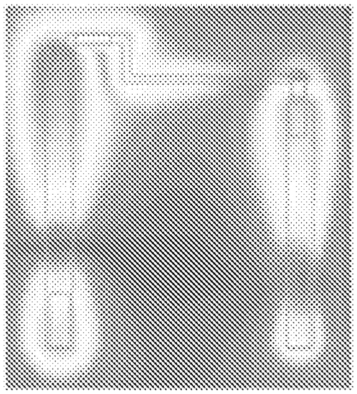
FIG. 11B is an electric field distribution diagram of an antenna apparatus at 0.88 GHz in an electronic device according to an embodiment of this application.
Figure 11C:
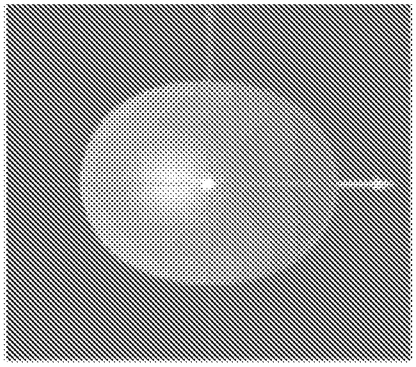
FIG. 11C is a radiation pattern of an antenna apparatus at 0.88 GHz in an electronic device according to an embodiment of this application.
Figure 12A:
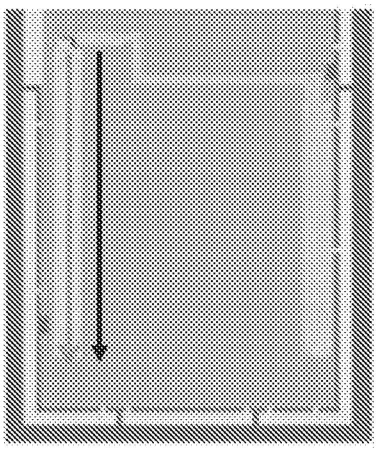
FIG. 12A is a current distribution diagram of an antenna apparatus at 0.92 GHz in an electronic device according to an embodiment of this application.
Figure 12B:
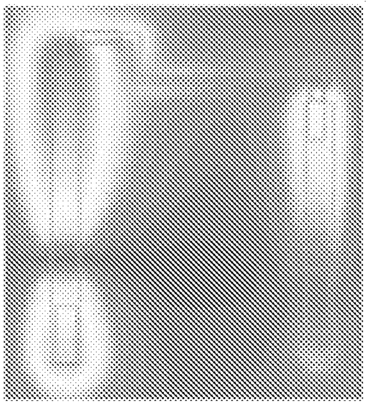
FIG. 12B is an electric field distribution diagram of an antenna apparatus at 0.92 GHz in an electronic device according to an embodiment of this application.
Figure 12C:
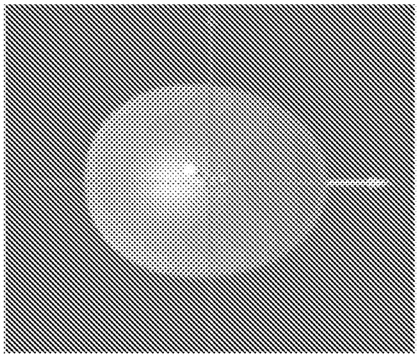
FIG. 12C is a radiation pattern of an antenna apparatus at 0.92 GHz in an electronic device according to an embodiment of this application.

In addition, FIG. 11A, FIG. 11B, and FIG. 11C are respectively a current distribution diagram, an electric field distribution diagram, and a radiation pattern corresponding to an antenna apparatus 100 at 0.88 GHz corresponding to a distributed feeding structure. FIG. 12A, FIG. 12B, and FIG. 12C are respectively a current distribution diagram, an electric field distribution diagram, and a radiation pattern corresponding to an antenna apparatus 100 at 0.92 GHz corresponding to a distributed feeding structure. After analyzing the current distribution diagram, the electric field distribution diagram, and the radiation pattern corresponding to the two resonances (0.88 GHz and 0.92 GHz) of the antenna apparatus 100 corresponding to the distributed feeding structure, it may be found that a low resonance is mainly generated by a second radiator 202 on a right side, and a high resonance is generated by a first metal radiator on a left side.

EMBODIMENT 2

Figure 13:
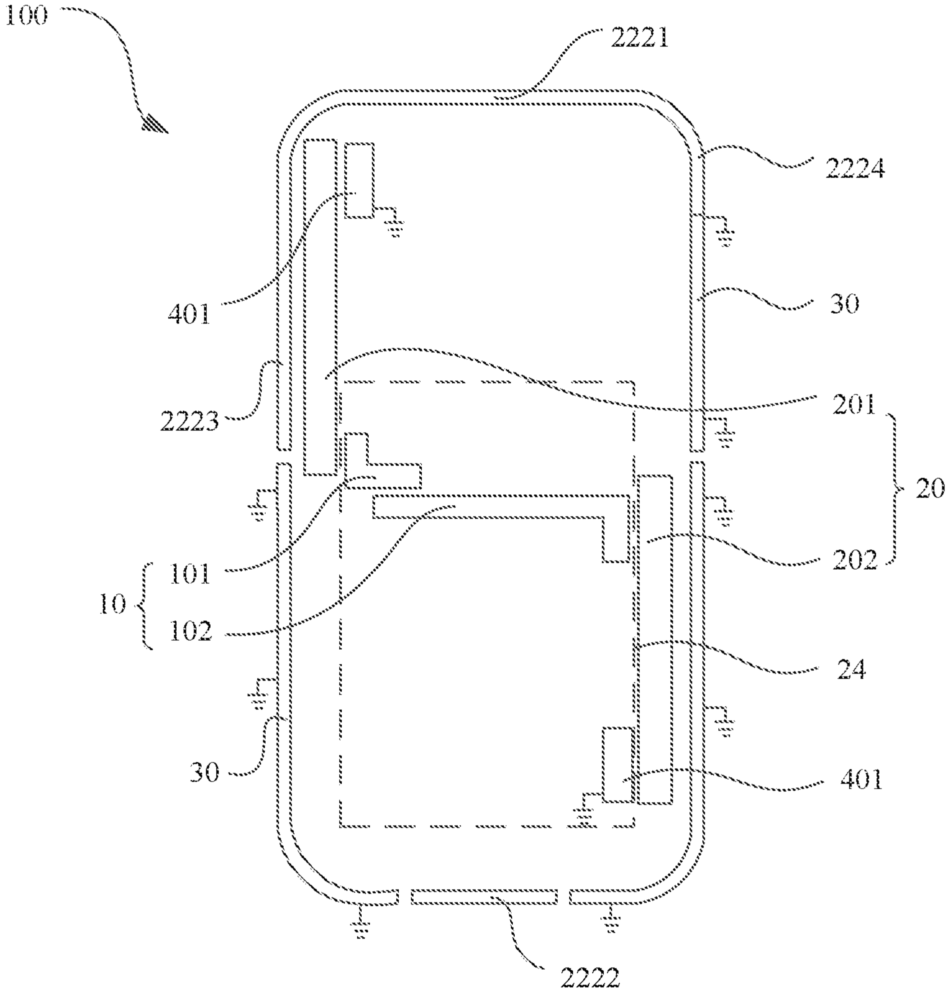
FIG. 13 is a schematic diagram of a structure of an antenna apparatus in an electronic device according to an embodiment of this application.

Different from the foregoing Embodiment 1, still referring to FIG. 13, one end of a first radiator 201 may extend toward a top frame of a middle frame 22, and one end of a second radiator 202 may extend toward a bottom frame of the middle frame 22. In addition, an orthographic projection of one low-frequency antenna towards a battery cover 25 may be opposite to the first radiator 201, and the orthographic projection of the one low-frequency antenna towards the battery cover 25 and the first radiator 201 may be respectively located on two sides of an orthographic projection of a battery 24 towards the battery cover 25. An orthographic projection of another low-frequency antenna towards the battery cover 25 may be opposite to the second radiator 202, and the orthographic projection of another low-frequency antenna towards the battery cover 25 and the second radiator 202 may be respectively located on two sides of the orthographic projection of the battery 24 towards the battery cover 25.

Specifically, still referring to FIG. 13, the first radiator 201 is arranged diagonally opposite to the second radiator 202, the first radiator 201 is arranged opposite to one low-frequency antenna along a central axis in a length direction of the frame, and the second radiator 202 is arranged opposite to another low-frequency antenna along the central axis in the length direction of the frame. One low-frequency antenna is arranged diagonally opposite to another low-frequency antenna. In this way, both the radiator (the first radiator 201 or the second radiator 202) and the metal frame antennas 30 (the two low-frequency antennas) are separately arranged, so that the radiator (the first radiator 201 or the second radiator 202) is far away from the metal frame antennas 30 in terms of spatial positions, and isolation between the first radiator 201 and the metal frame antennas 30 and between the second radiator 202 and the metal frame antenna 30 may be increased. In this way, an isolation effect between antenna modules in the antenna apparatus 100 may be effectively improved, and further, it may be ensured that the first radiator 201 and the second radiator 202 do not cause interference to the metal frame antennas 30 (the two low-frequency antennas).

Figure 14:
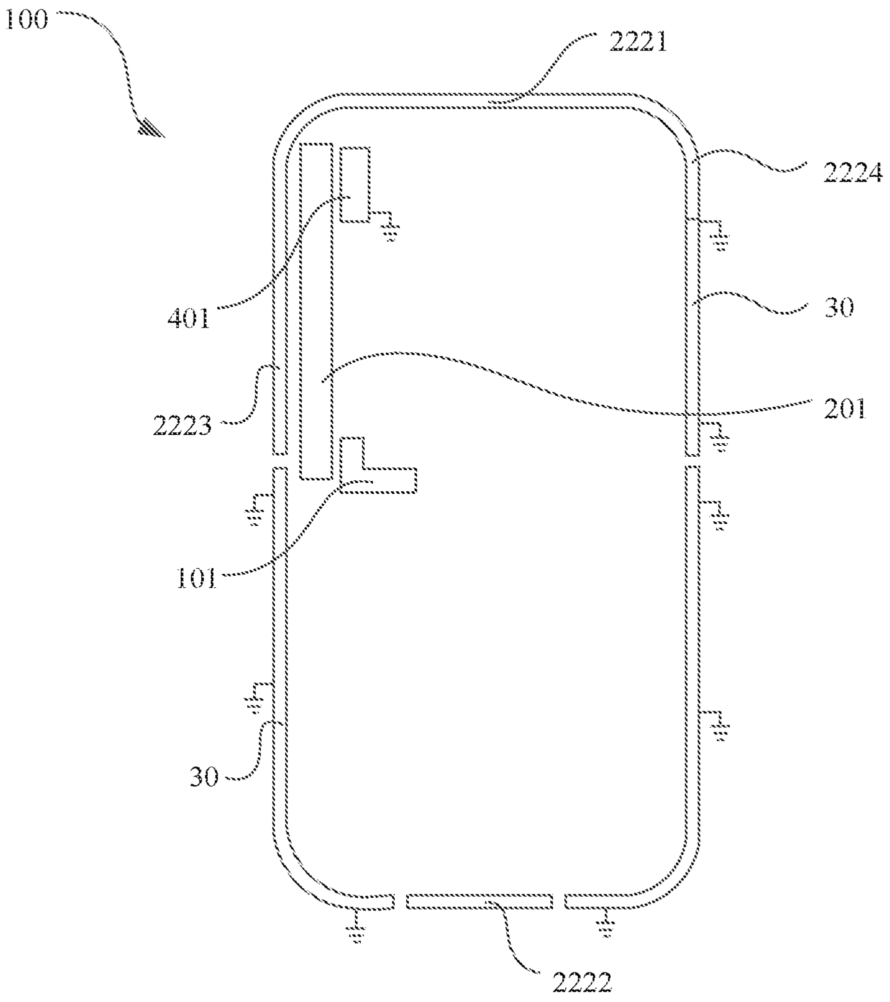
FIG. 14 is a schematic diagram of a structure of an antenna apparatus in an electronic device according to an embodiment of this application.
Figure 15:
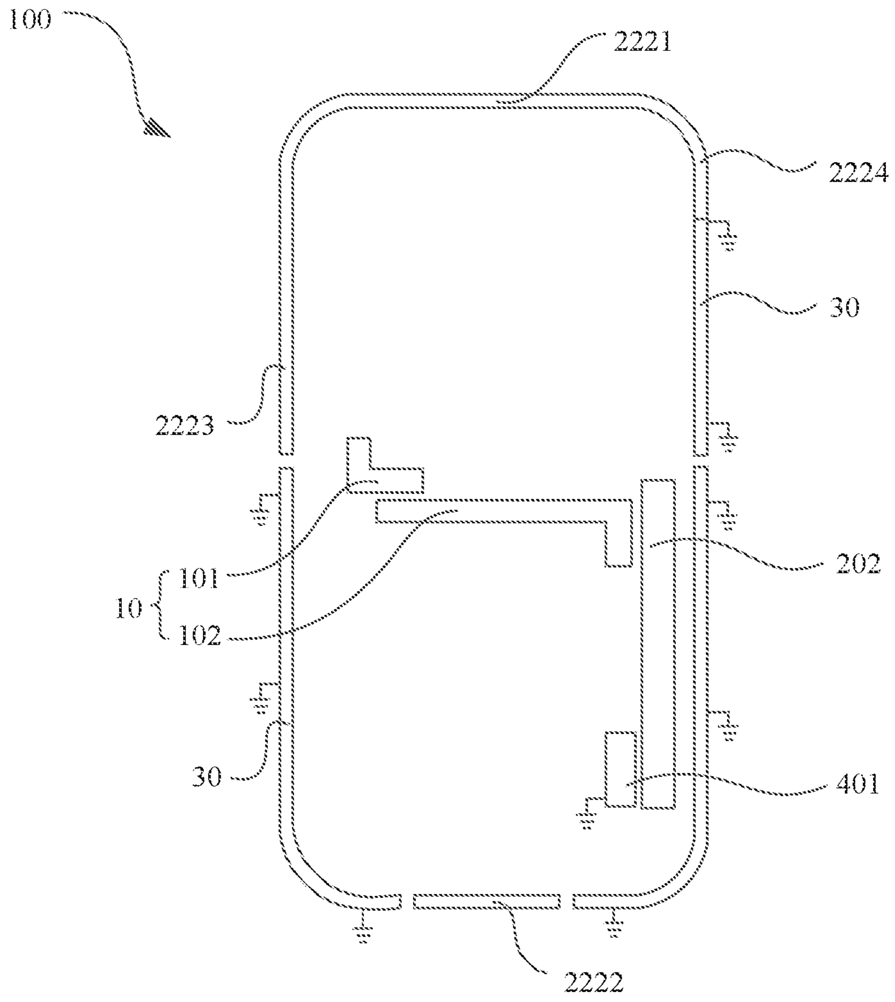
FIG. 15 is a schematic diagram of a structure of an antenna apparatus in an electronic device according to an embodiment of this application.
Figure 16:
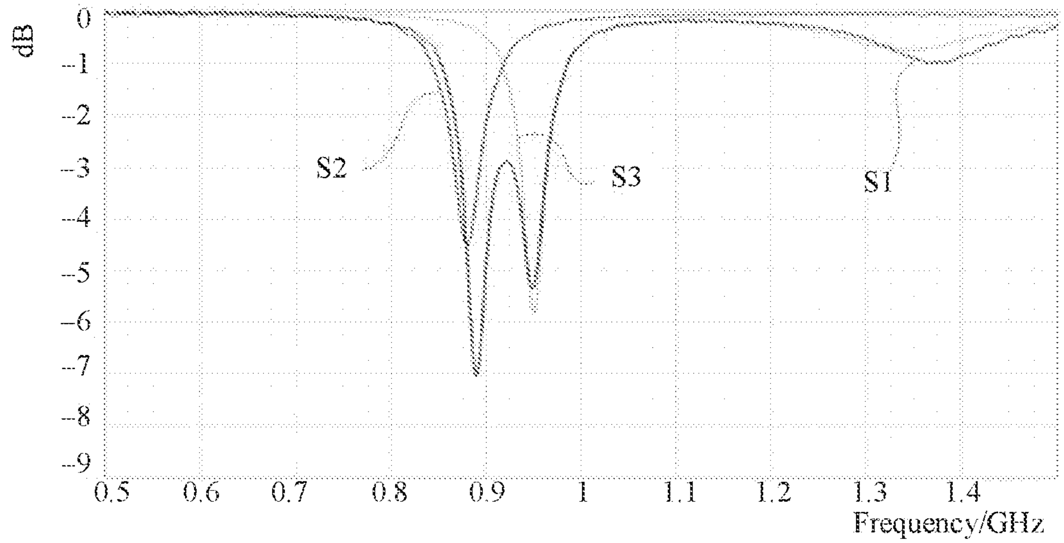
FIG. 16 is a performance comparison diagram of an antenna apparatus in an electronic device according to an embodiment of this application.
Figure 17:
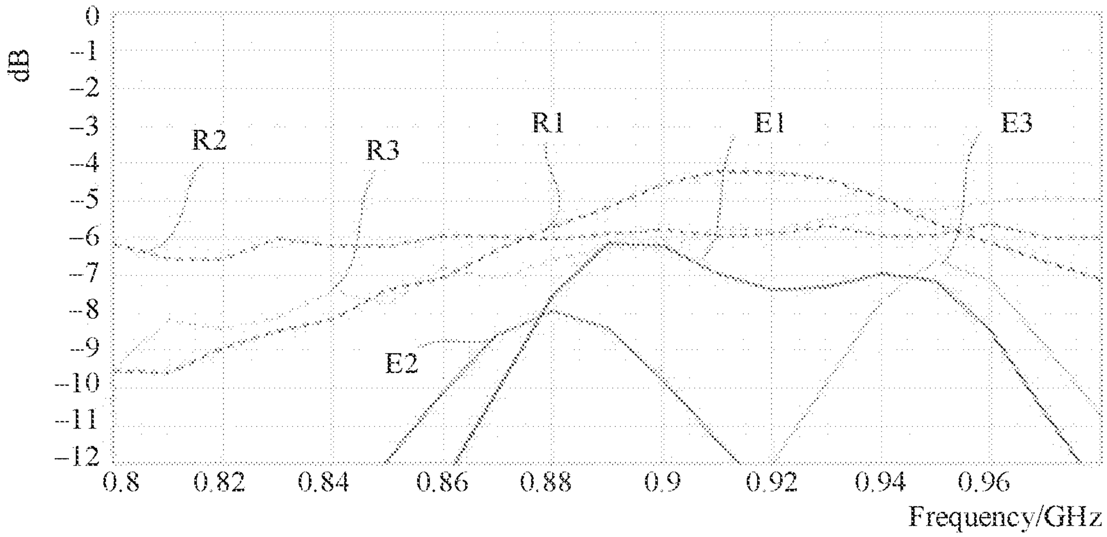
FIG. 17 is a performance comparison diagram of an antenna apparatus in an electronic device according to an embodiment of this application.

Similarly, based on the foregoing description, to further reflect advantages of the antenna apparatus 100, embodiments of this application further provide the antenna apparatus 100 whose radiation element 20 includes only the first radiator 201 (refer to FIG. 14) and the antenna apparatus 100 whose radiation element 20 includes only the second radiator 202 (refer to FIG. 15). In other words, FIG. 13 is a distributed radiator feeding structure, FIG. 14 is a left side single radiator feeding structure, and FIG. 15 is a right side single radiator feeding structure. Performance of the three antenna structures is also compared. Referring to FIG. 16, S1 shows a curve diagram of an antenna reflection coefficient changing with a frequency that corresponds to a distributed radiator feeding structure in free space (in a case that no interference is caused to the antenna apparatus 100). S2 shows a curve diagram of an antenna reflection coefficient changing with a frequency that corresponds to a left side single radiator feeding structure in free space. S3 shows a curve diagram of an antenna reflection coefficient changing with a frequency that corresponds to a right side single radiator feeding structure in free space. Referring to FIG. 17, E1 shows curve diagram of system efficiency changing with a frequency that corresponds to a distributed radiator feeding structure in free space. E2 shows a curve diagram of system efficiency changing with a frequency that corresponds to a left side single radiator feeding structure in free space. E3 shows a curve diagram of system efficiency changing with a frequency that corresponds to a right side single radiator feeding structure in free space. R1 shows a curve diagram of radiation efficiency changing with a frequency that corresponds to a distributed radiator feeding structure in free space. R2 shows a curve diagram of radiation efficiency changing with a frequency that corresponds to a left side single radiator feeding structure in free space. R3 shows a curve diagram of radiation efficiency changing with a frequency that corresponds to a right side single radiator feeding structure in free space. It may be learned from the figure that compared with the single radiator feeding structure, the distributed radiator feeding structure improves efficiency by nearly 2 dB, and a bandwidth (a bandwidth occupied by signals) of the distributed radiator feeding structure is more than doubled.

Figure 18A:
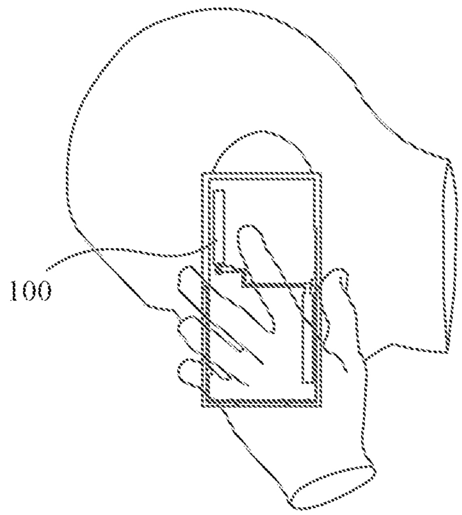
FIG. 18A is a diagram of an actual application scenario in which an antenna apparatus in an electronic device is held close to a left ear by using a left hand according to an embodiment of this application.
Figure 18B:
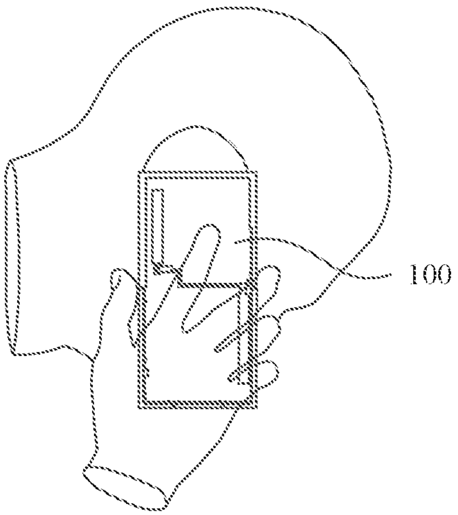
FIG. 18B is a diagram of an actual application scenario in which an antenna apparatus in an electronic device is held close to a right ear by using a right hand according to an embodiment of this application.
Figure 19:
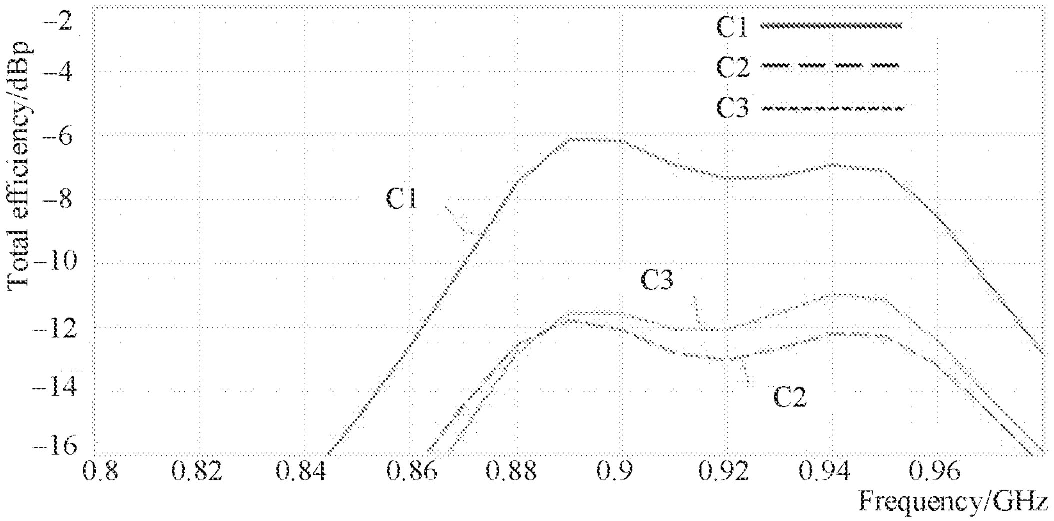
FIG. 19 is a performance comparison diagram of an antenna apparatus in an electronic device according to an embodiment of this application.
Figure 20:
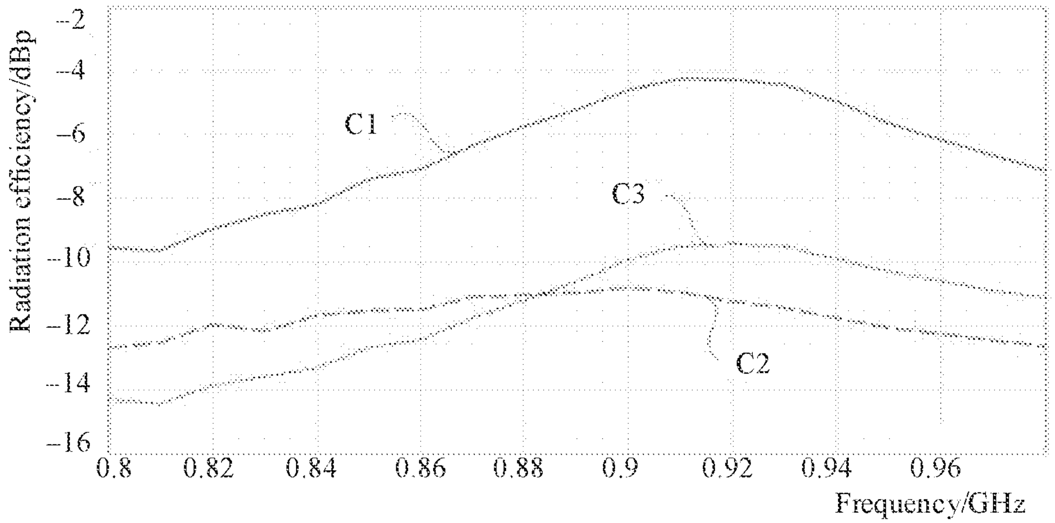
FIG. 20 is a performance comparison diagram of an antenna apparatus in an electronic device according to an embodiment of this application.
Figure 21A:
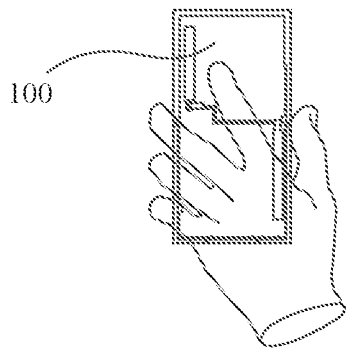
FIG. 21A is a diagram of an actual application scenario in which an antenna apparatus in an electronic device is held by using a left hand according to an embodiment of this application.
Figure 21B:
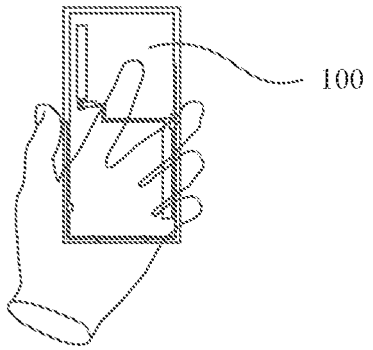
FIG. 21B is a diagram of an actual application scenario in which an antenna apparatus in an electronic device is held by using a right hand according to an embodiment of this application.
Figure 22:
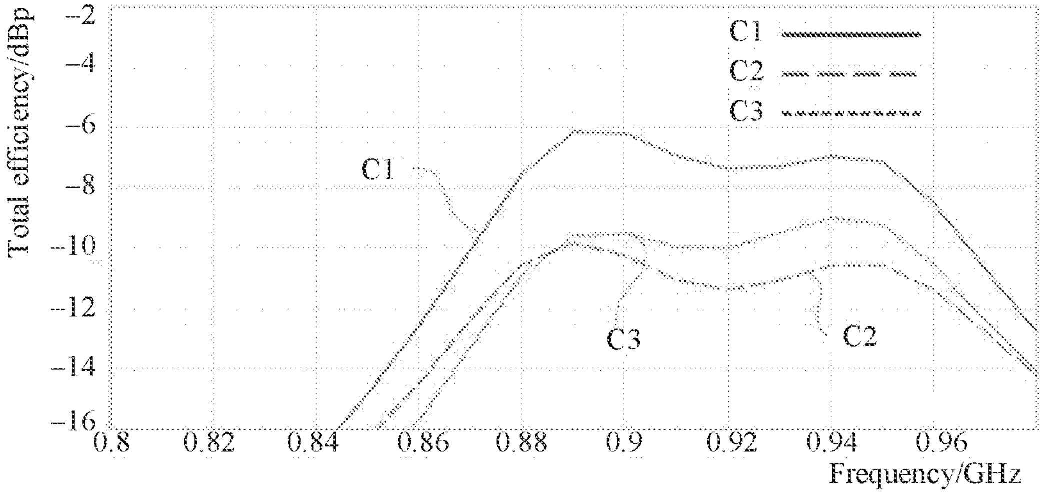
FIG. 22 is a performance comparison diagram of an antenna apparatus in an electronic device according to an embodiment of this application.
Figure 23:
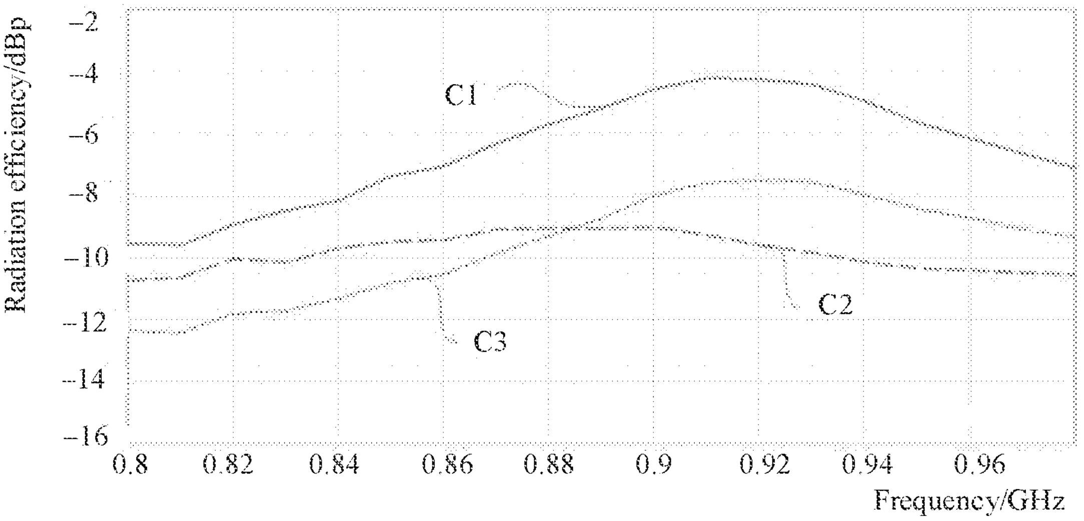
FIG. 23 is a performance comparison diagram of an antenna apparatus in an electronic device according to an embodiment of this application.

In addition, based on head-hand performance of the antenna apparatus 100 corresponding to the distributed radiator feeding structure shown in FIG. 13 in the actual application scenario, namely, a simulation evaluation of the electronic device such as the mobile phone 200 being held close to a head by hand, the mobile phone 200 being held close to a left ear by a left hand (refer to FIG. 18A), and the mobile phone 200 being held close to a right ear by a right hand (refer to FIG. 18B), and based on hand holding performance of the antenna apparatus 100 corresponding to the distributed radiator feeding structure shown in FIG. 13 in the actual application scenario, namely, a hand holding electronic device, such as the mobile phone 200, and a simulation evaluation of the mobile phone 200 being held by a left hand (refer to FIG. 21A), and the mobile phone 200 being held by a right hand (refer to FIG. 21B) are respectively shown in FIG. 19 and FIG. 20, and FIG. 22 and FIG. 23. In FIG. 19 and FIG. 20, C1 shows a corresponding curve diagram in a free space state, C2 shows a corresponding curve diagram when a mobile phone 200 is held close to a left ear by a left hand, and C3 shows a corresponding curve diagram when a mobile phone 200 is held close to a right ear by a right hand. In FIG. 22 and FIG. 23, C1 shows a corresponding curve diagram in a free space state, C2 shows a corresponding curve diagram when a mobile phone 200 is held by a left hand, and C3 shows a corresponding curve diagram when a mobile phone 200 is held by a right hand. It may be learned from the figure that left and right head-hand performance and left and right hand holding performance of the distributed radiator feeding structure are balanced, and a difference is less than 1 dB.

Figure 24A:
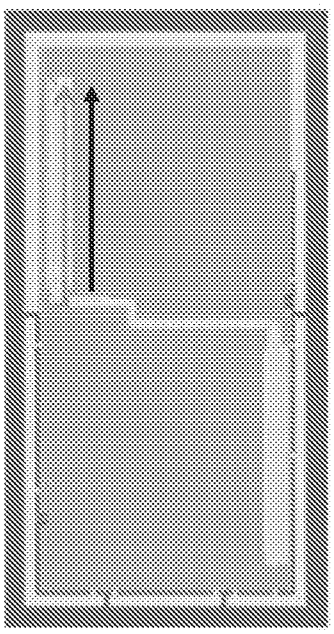
FIG. 24A is a current distribution diagram of an antenna apparatus at 0.89 GHz in an electronic device according to an embodiment of this application.
Figure 24B:
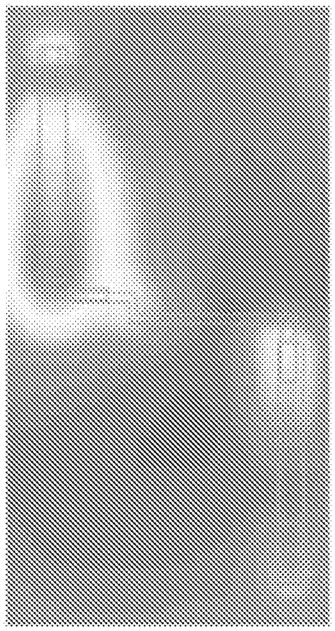
FIG. 24B is an electric field distribution diagram of an antenna apparatus at 0.89 GHz in an electronic device according to an embodiment of this application.
Figure 25A:
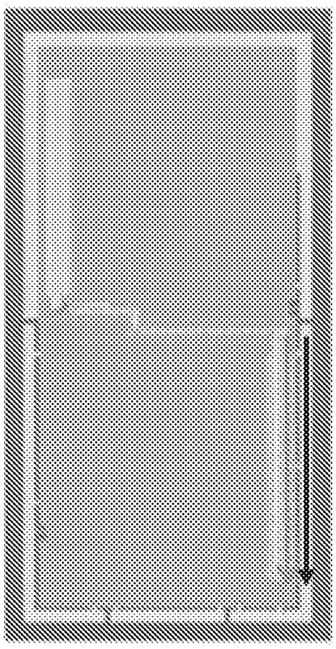
FIG. 25A is a current distribution diagram of an antenna apparatus at 0.95 GHz in an electronic device according to an embodiment of this application.
Figure 25B:
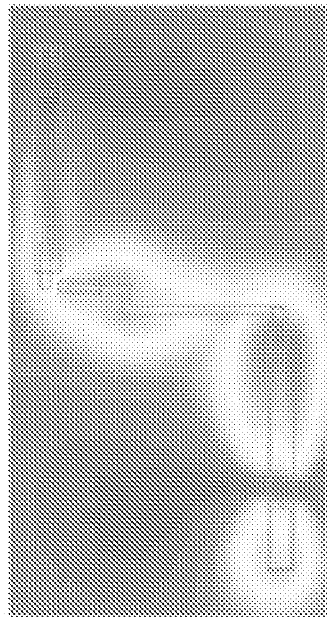
FIG. 25B is an electric field distribution diagram of an antenna apparatus at 0.95 GHz in an electronic device according to an embodiment of this application.

In addition, FIG. 24A and FIG. 24B are respectively a current distribution diagram and an electric field distribution diagram corresponding to an antenna apparatus 100 at 0.89 GHz corresponding to a distributed feeding structure. FIG. 25A and FIG. 25B are respectively a current distribution diagram and an electric field distribution diagram corresponding to an antenna apparatus 100 at 0.95 GHz corresponding to a distributed feeding structure. After analyzing the current distribution diagram and the electric field distribution diagram corresponding to the two resonances (0.89 GHz and 0.95 GHz) of the antenna apparatus 100 corresponding to the distributed radiator feeding structure, it may be found that a low resonance is mainly generated by a first radiator 201 on a left side, and a high resonance is generated by a second radiator 202 on a right side.

In addition, when the metal frame antenna 30 also radiates, an example in which the first radiator 201 and the second radiator 202 are low-frequency antennas is used. As shown FIG. 13, the distributed antennas (the first radiator 201 and the second radiator 202) and the two low-frequency antennas (the metal frame antennas 30) operate in a same frequency band.

Figure 26:
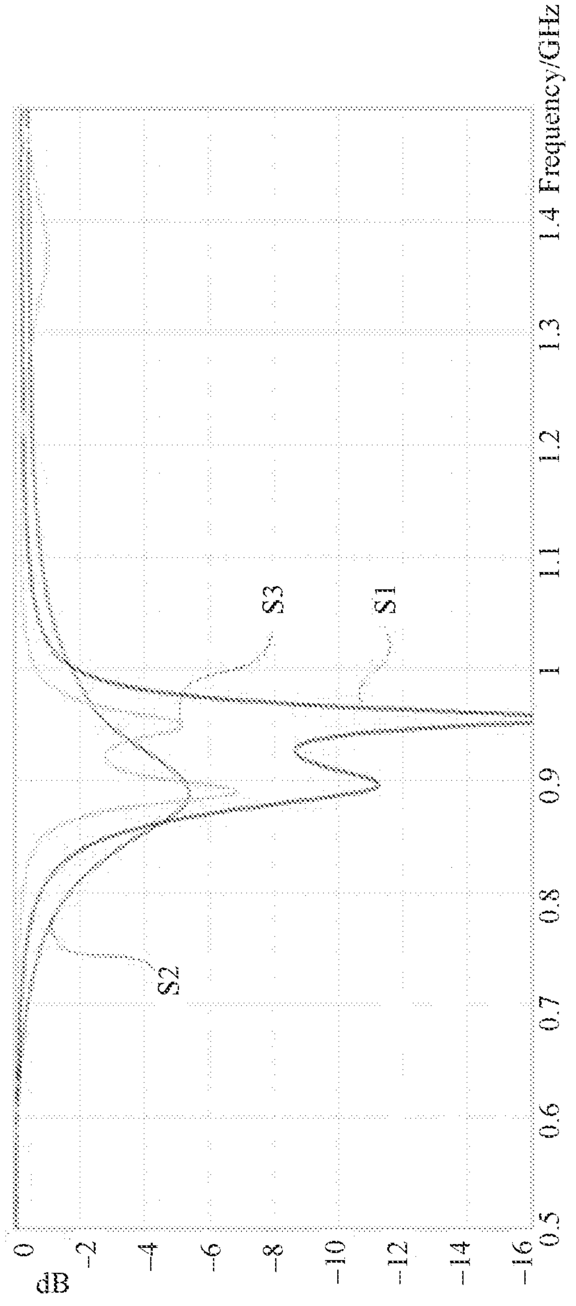
FIG. 26 is a performance comparison diagram of an antenna apparatus in an electronic device according to an embodiment of this application.
Figure 27:
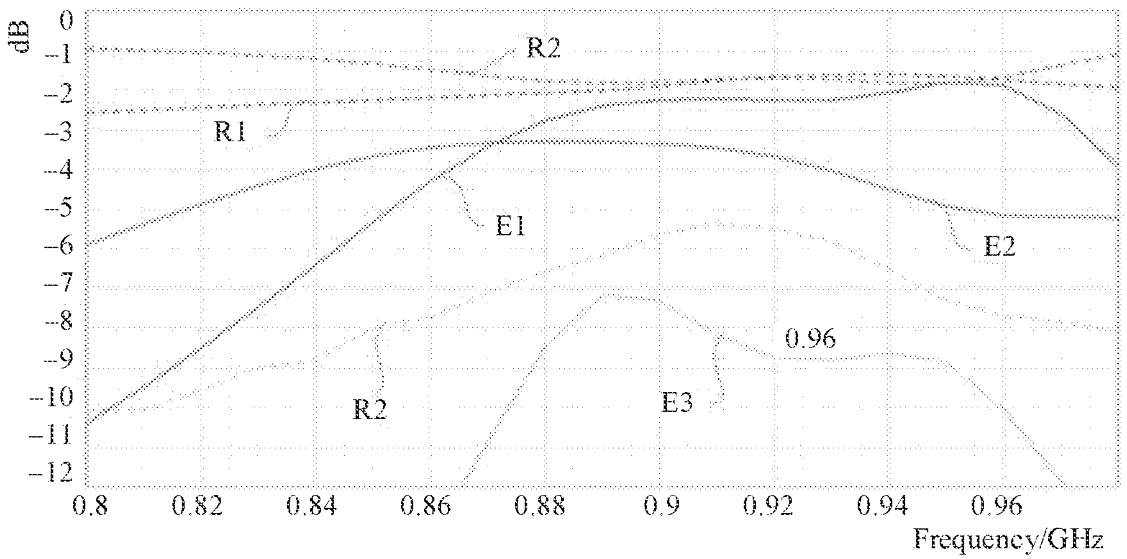
FIG. 27 is a performance comparison diagram of an antenna apparatus in an electronic device according to an embodiment of this application.

For example, in FIG. 13, using an example in which a metal frame antenna 30 on a left side is used as a first low-frequency antenna (ant1), a metal frame antenna 30 on a right side is used as a second low-frequency antenna (ant2), and the first radiator 201 and the second radiator 202 are used as third low-frequency antennas (ant3). FIG. 26 and FIG. 27 show antenna reflection coefficient curves and efficiency curves of the three low-frequency antennas in free space. S1 shows a curve diagram of an antenna reflection coefficient corresponding to a first low-frequency antenna. S2 shows a curve diagram of an antenna reflection coefficient corresponding to a second low-frequency antenna. S3 shows a curve diagram of an antenna reflection coefficient corresponding to a third low-frequency antenna. E1 shows a curve diagram of system efficiency corresponding to a first low-frequency antenna. E2 shows a curve diagram of system efficiency corresponding to a second low-frequency antenna. E3 shows a curve diagram of system efficiency corresponding to a third low-frequency antenna. R1 shows a curve diagram of radiation efficiency corresponding to a first low-frequency antenna. R2 shows a curve diagram of radiation efficiency corresponding to a second low-frequency antenna. R3 shows a curve diagram of radiation efficiency corresponding to a third low-frequency antenna. It may be learned from the figure that performance of the three low-frequency antennas is normal in a co-frequency state.

Figure 28:
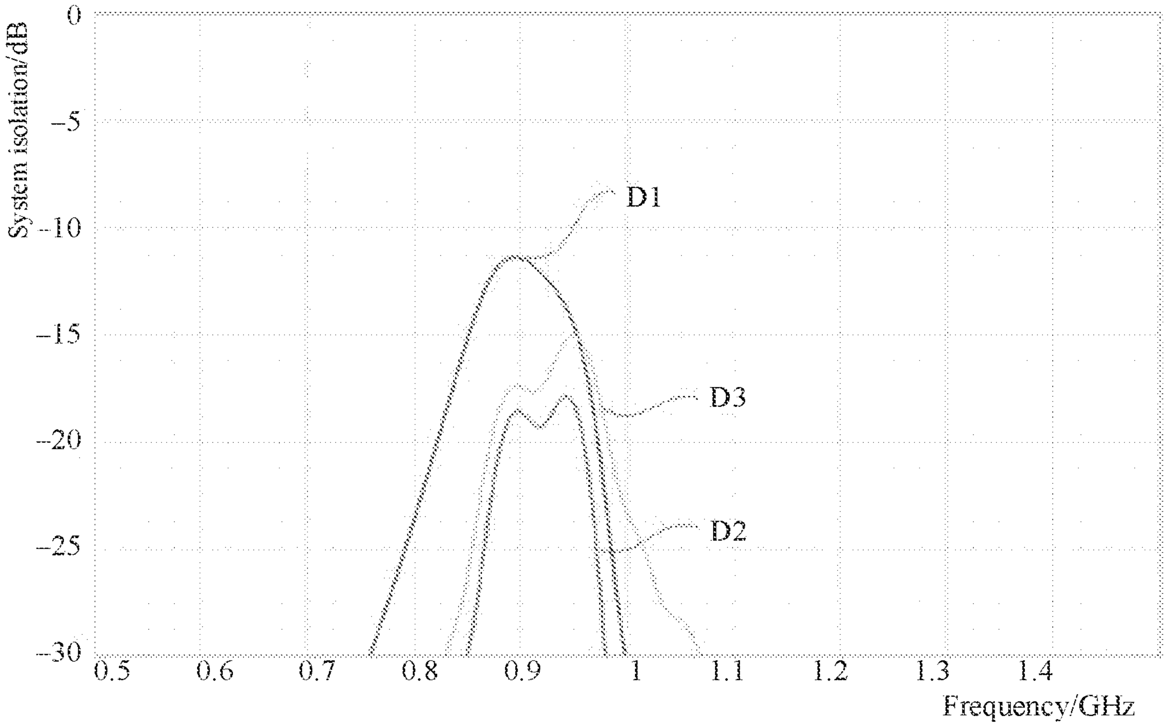
FIG. 28 is a performance comparison diagram of an antenna apparatus in an electronic device according to an embodiment of this application.

In addition, FIG. 28 is a curve diagram of system isolation corresponding to the three low-frequency antennas. D1 shows a curve diagram corresponding to system isolation between a second low-frequency antenna and a first low-frequency antenna. D2 shows a curve diagram corresponding to system isolation between a third low-frequency antenna and a first low-frequency antenna. D3 shows a curve diagram corresponding to system isolation between a third low-frequency antenna and a second low-frequency antenna. It may be learned from the figure that system isolation between every two of the three antennas is greater than 12 dB. To be specific, it indicates that radiation performance of the antenna apparatus 100 shown in FIG. 13 is very good.

| ECC at 0.89 GHz/0.95 GHz | ant1 | ant2 | ant3 |
|---|---|---|---|
| ant1 | | | |
| ant2 | 0.14/0.1 | | |
| ant3 | 0.15/0.13 | 0.23/0.47 | |

Figure 29A:
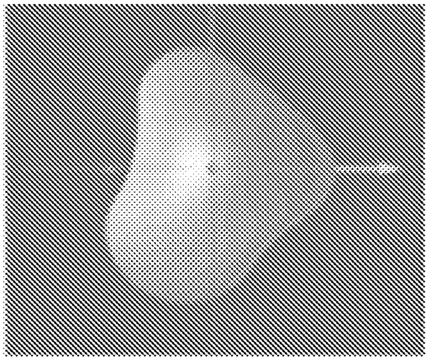
FIG. 29A is a radiation pattern of a first low-frequency antenna of an antenna apparatus at 0.89 GHz in an electronic device according to an embodiment of this application.
Figure 29B:
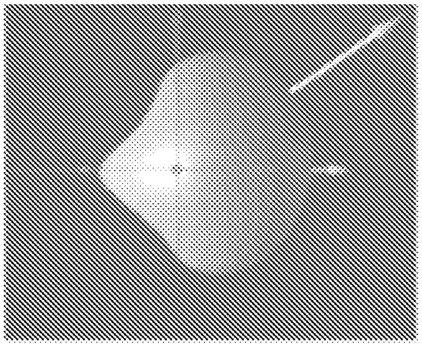
FIG. 29B is a radiation pattern of a second low-frequency antenna of an antenna apparatus at 0.89 GHz in an electronic device according to an embodiment of this application.
Figure 29C:
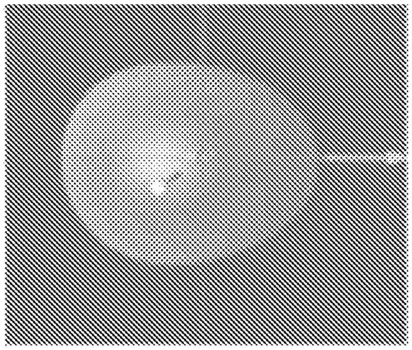
FIG. 29C is a radiation pattern of a third low-frequency antenna of an antenna apparatus at 0.89 GHz in an electronic device according to an embodiment of this application.
Figure 30A:
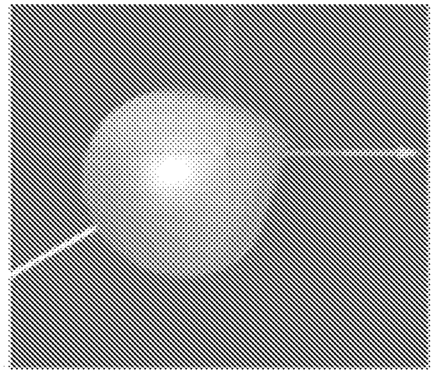
FIG. 30A is a radiation pattern of a first low-frequency antenna of an antenna apparatus at 0.95 GHz in an electronic device according to an embodiment of this application.
Figure 30B:
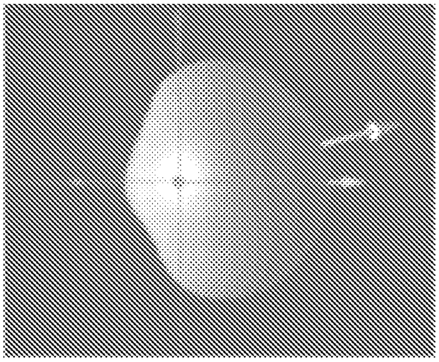
FIG. 30B is a radiation pattern of a second low-frequency antenna of an antenna apparatus at 0.95 GHz in an electronic device according to an embodiment of this application.
Figure 30C:
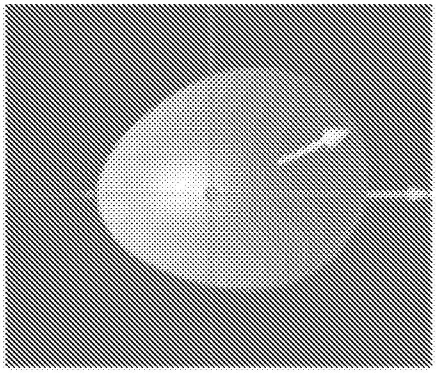
FIG. 30C is a radiation pattern of a third low-frequency antenna of an antenna apparatus at 0.95 GHz in an electronic device according to an embodiment of this application.

FIG. 29A, FIG. 29B, and FIG. 29C respectively show radiation patterns of the three low-frequency antennas at 0.89 GHz. FIG. 30A, FIG. 30B, and FIG. 30C respectively show radiation patterns of the three low-frequency antennas at 0.95 GHz. In addition, envelope correlation coefficients (Envelope Correlation Coefficient, ECC) of the foregoing three low-frequency antennas at two frequencies are shown in the foregoing table. Similarly, the first radiator 201 and the second radiator 202 in FIG. 13 are used as the third low-frequency antenna (ant3). The metal frame antenna 30 on the left side is used as the first low-frequency antenna (ant1), and the metal frame antenna 30 on the right side is used as the second low-frequency antenna (ant2). It may be learned from the foregoing table that the ECCs of the three low-frequency antennas at two frequencies (0.89 GHz and 0.95 GHz) are all less than 0.5. Therefore, it may be learned that the distributed antenna design shown in FIG. 13 is a good MIMO antenna design scheme.

In embodiments of this application, other technical features are the same as those in Embodiment 1, and a same or corresponding technical effect may be achieved. Details are not described herein again.

EMBODIMENT 3

Figure 31A:
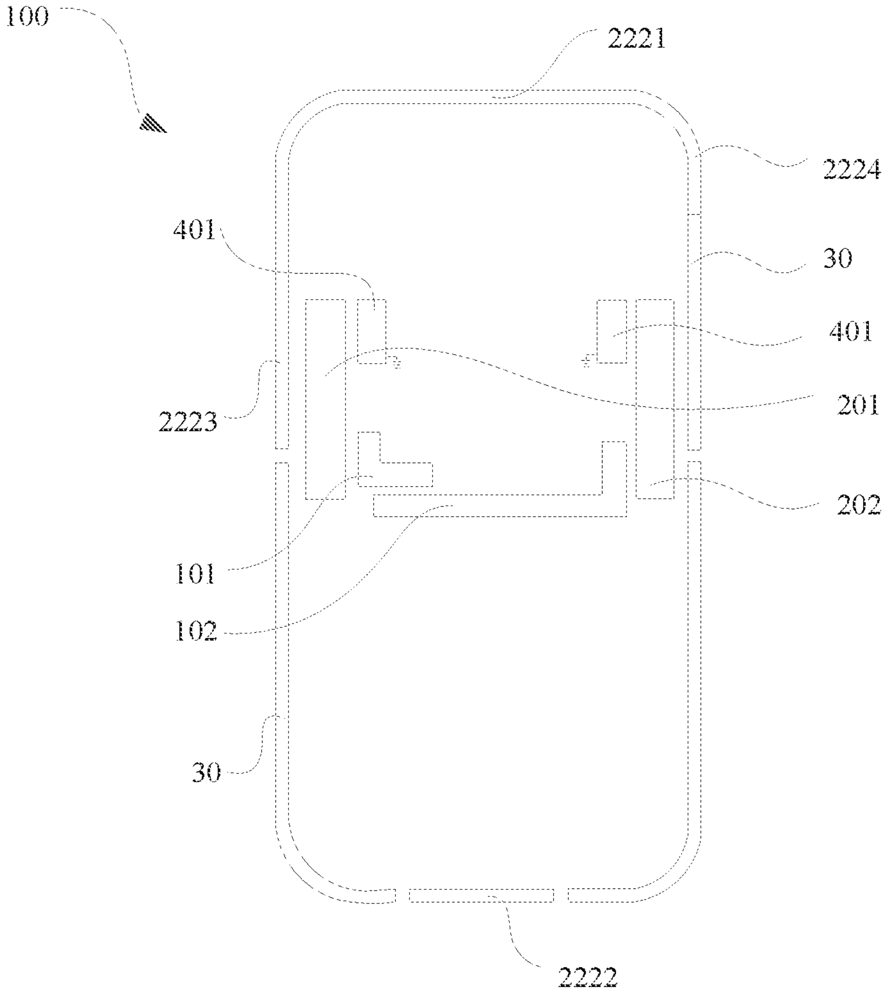
FIG. 31A is a schematic diagram of a structure of an antenna apparatus in an electronic device according to an embodiment of this application.

Different from the foregoing Embodiment 1 or Embodiment 2, the radiator in embodiments of this application is a medium and high frequency radiator. For example, a length of the radiator may be reduced to implement an increase of a frequency hand. Two medium and high frequency radiators (for example, floating metal antennas) are located on a left side and a right side, and a connection is implemented through a coupling feeding element 10 (for example, a floating metal). Specifically, compared with Embodiment 1, referring to FIG. 31A, both a length of a first radiator 201 and a length of a second radiator 202 are shortened. In embodiments of this application, an operating frequency band of the first radiator 201 and an operating frequency band of the second radiator 202 are improved by shortening the length of the first radiator 201 and the length of the second radiator 202. Specifically, with reference to FIG. 3 and FIG. 31A, compared with FIG. 3, the length of the first radiator 201 and the length of the second radiator 202 in the antenna apparatus 100 shown in FIG. 31A are short.

In embodiments of this application, the first radiator 201 and the second radiator 202 are medium and high frequency antennas. When the first radiator 201 and the second radiator 202 are used as the medium and high frequency antennas, the operating frequency band of the first radiator 201 and the operating frequency band of the second radiator 202 may be greater than 1000 MHz. For example, the operating frequency hand of the first radiator 201 and the operating frequency band of the second radiator 202 may be 1000 MHz, 1100 MHz, 1200 MHz, or the like. This is not limited in embodiments of this application, and is not limited to the foregoing example.

Figure 31B:
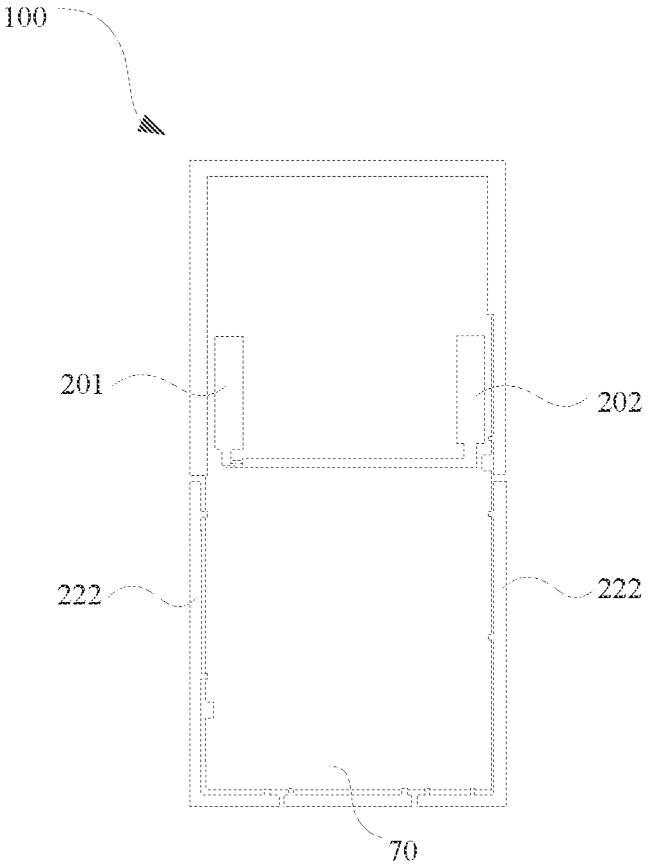
FIG. 31B is a simulation model diagram of an antenna apparatus in an electronic device according to an embodiment of this application.

In addition, FIG. 31B is a simulation model diagram of an antenna apparatus 100 according to an embodiment of this application. The simulation model and an antenna environment are the same as or similar to those in Embodiment 1, and details are not described herein again.

Figure 32:
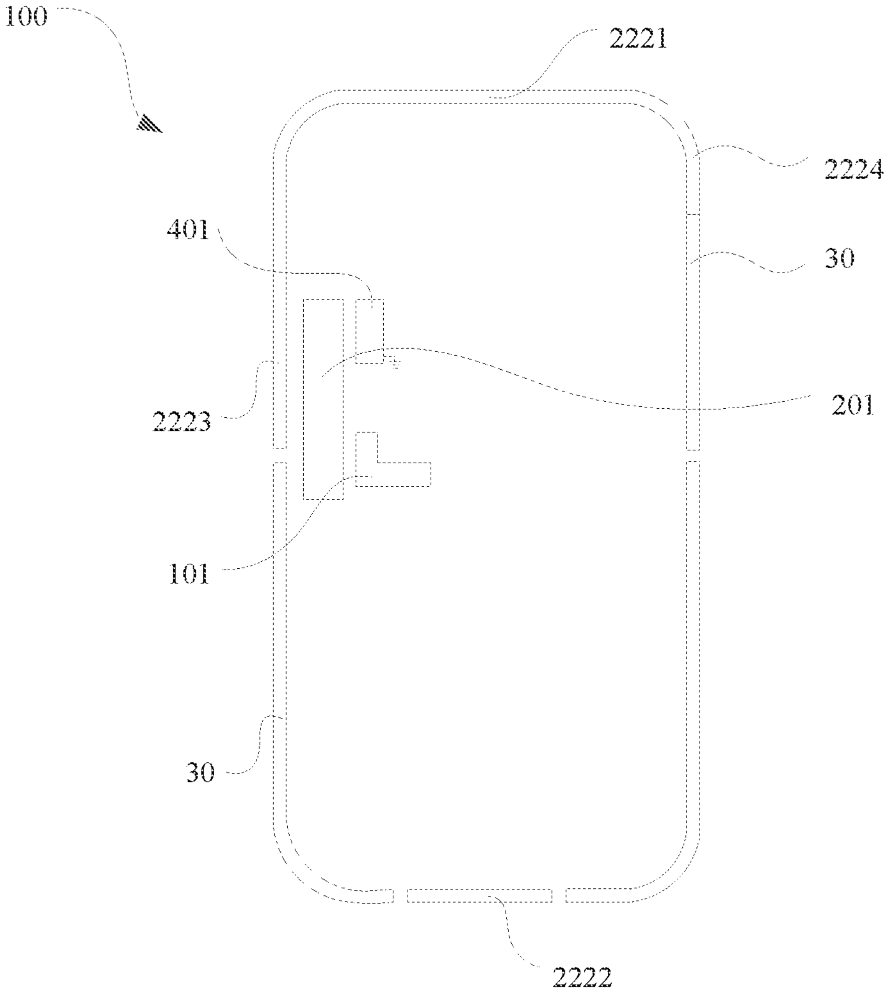
FIG. 32 is a schematic diagram of a structure of an antenna apparatus in an electronic device according to an embodiment of this application.
Figure 33:
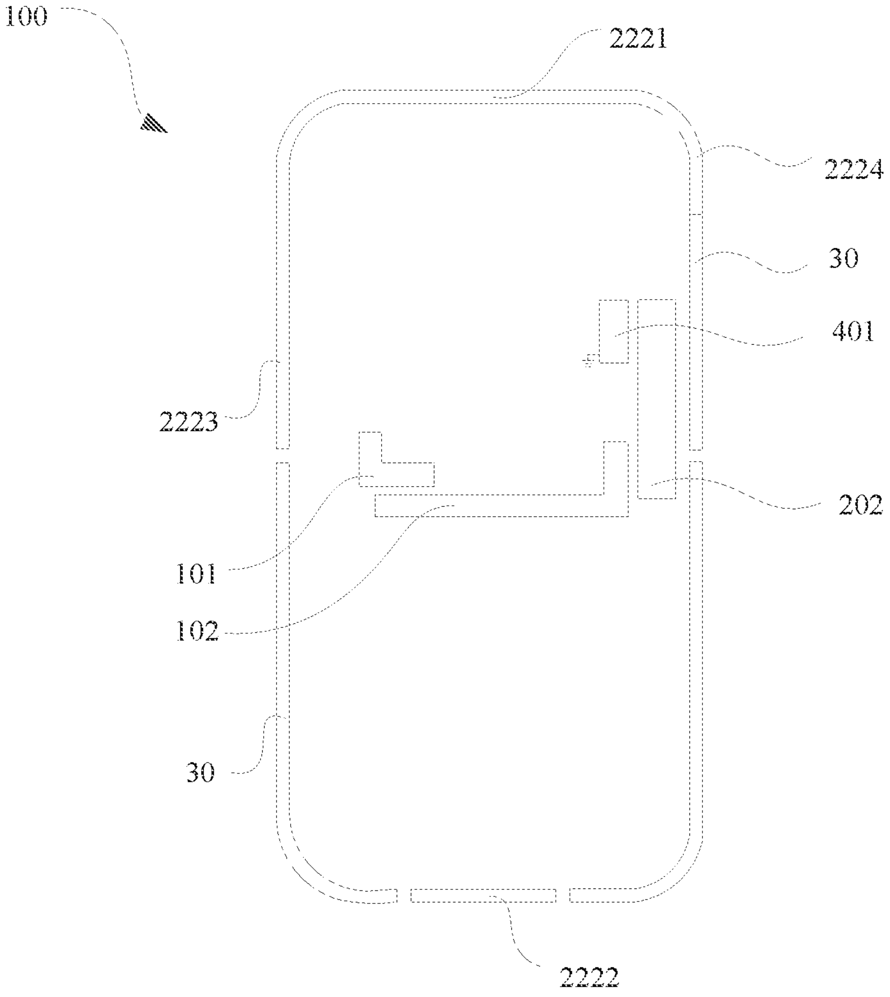
FIG. 33 is a schematic diagram of a structure of an antenna apparatus in an electronic device according to an embodiment of this application.
Figure 34:
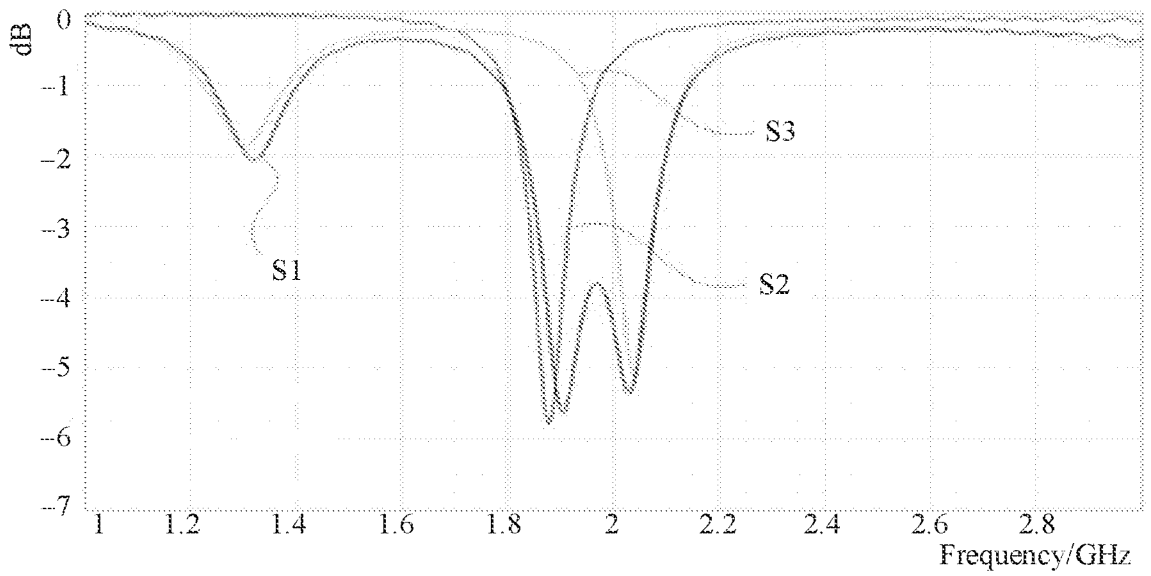
FIG. 34 is a performance comparison diagram of an antenna apparatus in an electronic device according to an embodiment of this application.
Figure 35:
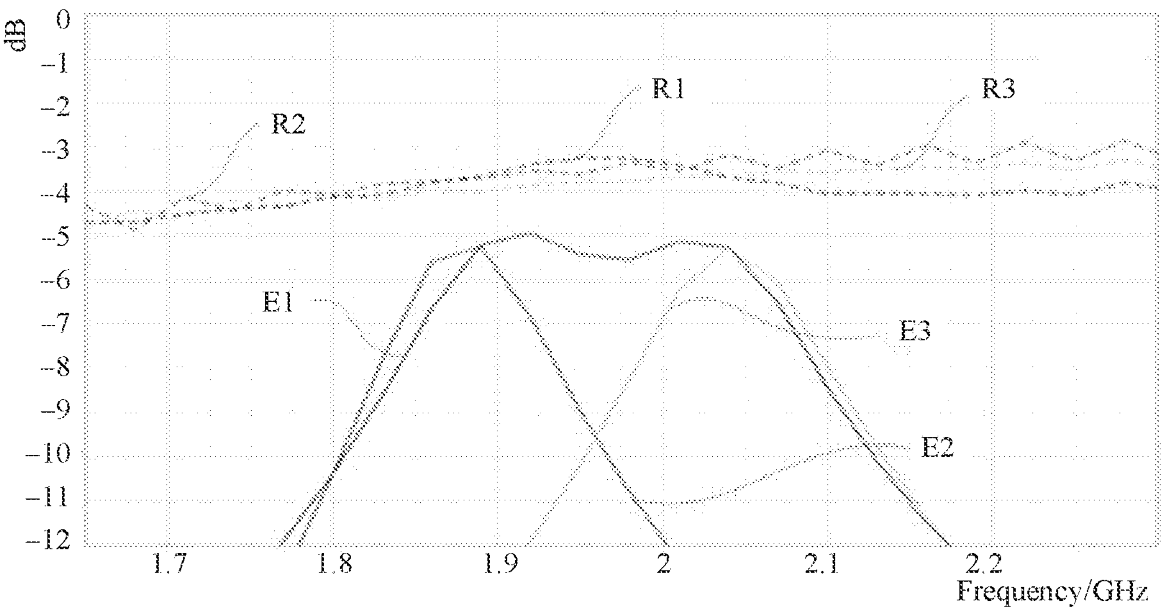
FIG. 35 is a performance comparison diagram of an antenna apparatus in an electronic device according to an embodiment of this application.

Similarly, based on the foregoing description, to further reflect advantages of the antenna apparatus 100, embodiments of this application further provide the antenna apparatus 100 whose radiation element 20 includes only the first radiator 201 (refer to FIG. 32) and the antenna apparatus 100 whose radiation element 20 includes only the second radiator 202 (refer to FIG. 33). In other words, FIG. 31A is a distributed radiator feeding structure, FIG. 32 is a left side single radiator feeding structure, and FIG. 33 is a right side single radiator feeding structure. Referring to FIG. 34, S1 shows a curve diagram of an antenna reflection coefficient changing a frequency that corresponds to a distributed radiator feeding structure in free space (in a case that no interference is caused to the antenna apparatus 100). S2 shows a curve diagram of an antenna reflection coefficient changing frequency that corresponds to a left side single radiator feeding structure in free space. S3 shows a curve diagram of an antenna reflection coefficient changing with a frequency that corresponds to a right side single radiator feeding structure in free space. Referring to FIG. 35, E1 shows a curve diagram of system efficiency changing with a frequency that corresponds to a distributed radiator feeding structure in free space. E2 shows a curve diagram of system efficiency changing with a frequency that corresponds to a left side single radiator feeding structure in free space. E3 shows a curve diagram of system efficiency changing with a frequency that corresponds to a right side single radiator feeding structure in free space. R1 shows a curve diagram of radiation efficiency changing with a frequency that corresponds to a distributed radiator feeding structure in free space. R2 shows a curve diagram of radiation efficiency changing with a frequency that corresponds to a left side single radiator feeding structure in free space. R3 shows a curve diagram of radiation efficiency changing with a frequency that corresponds to a right side single radiator feeding structure in free space. It may be learned from the figure that compared with the single radiator feeding structure, and a bandwidth (a bandwidth occupied by signals) of the distributed radiator feeding structure is more than doubled. In addition, two resonances of the distributed radiator feeding structure respectively correspond to resonances of two different elements of the single radiator feeding structure.

Figure 36:
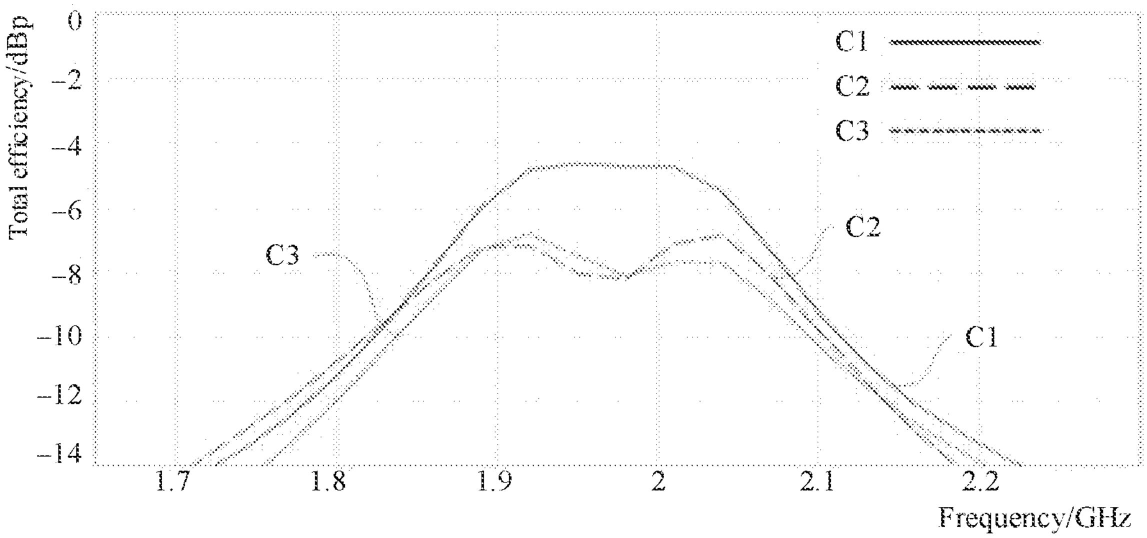
FIG. 36 is a performance comparison diagram of an antenna apparatus in an electronic device according to an embodiment of this application.
Figure 37:
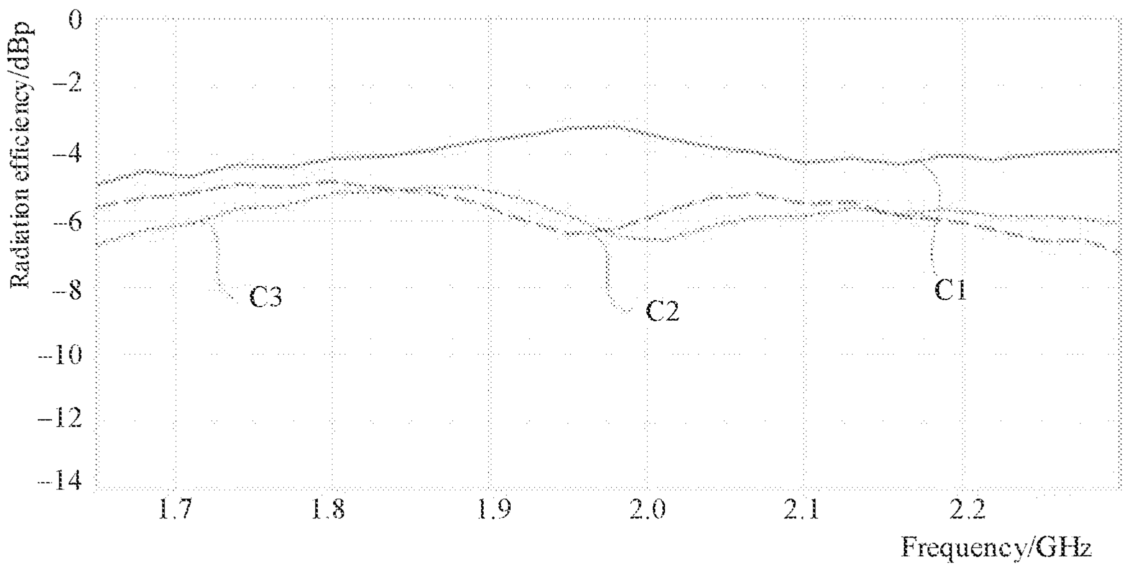
FIG. 37 is a performance comparison diagram of an antenna apparatus in an electronic device according to an embodiment of this application.

In addition FIG. 36 and FIG. 37 show antenna performance corresponding to a distributed radiator feeding structure held by a left hand and a right hand. There is an application evaluation of hand holding performance of the antenna apparatus 100 shown in FIG. 31A in an actual scenario (to be specific, holding the electronic device such as a mobile phone 200 by hand, holding a mobile phone 200 by a left hand, or holding a mobile phone 200 by a right hand). As shown in FIG. 36 and FIG. 37, C1 shows a corresponding curve diagram in a free space state. C2 shows a corresponding curve diagram in a state of holding a mobile phone 200 by a left hand. C3 shows a corresponding curve diagram in a state of holding a mobile phone 200 by a right hand. It may be learned from the figure that in a case of left hand holding and right hand holding, efficiency is only 2 dB to 3 dB lower than efficiency in the free space state, and the efficiency is balanced.

Figure 38A:
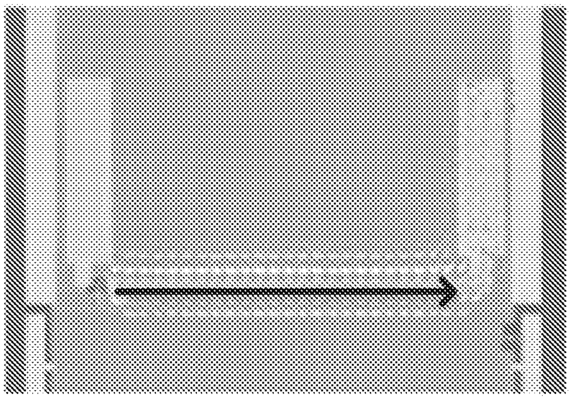
FIG. 38A is a current distribution diagram of an antenna apparatus at 1.3 GHz in an electronic device according to an embodiment of this application.
Figure 38B:
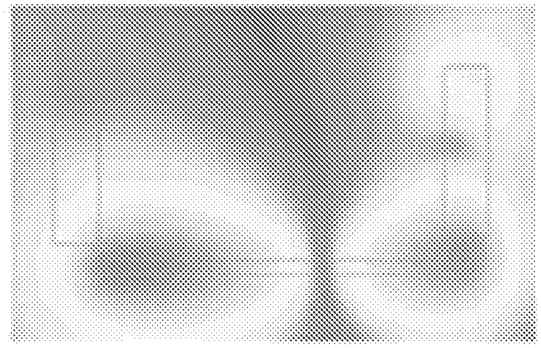
FIG. 38B is an electric field distribution diagram of an antenna apparatus at 1.3 GHz in an electronic device according to an embodiment of this application.
Figure 38C:
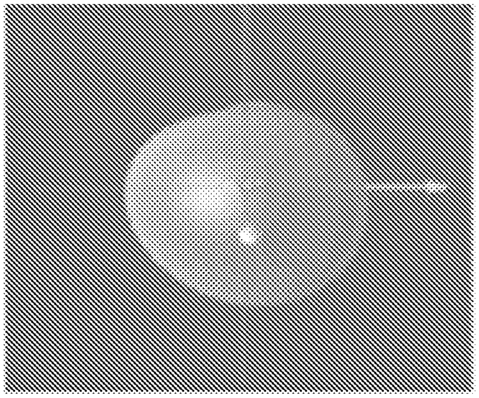
FIG. 38C is a radiation pattern of an antenna apparatus at 1.3 GHz in an electronic device according to an embodiment of this application.
Figure 39A:
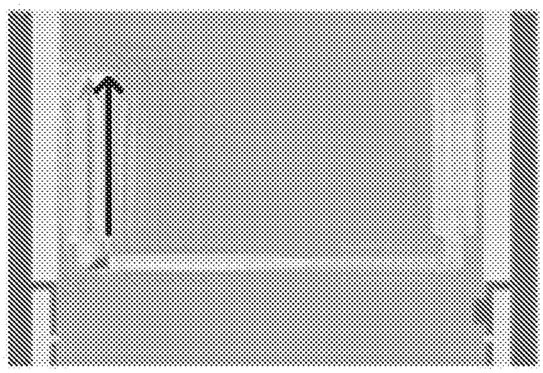
FIG. 39A is a current distribution diagram of an antenna apparatus at 1.9 GHz in an electronic device according to an embodiment of this application.
Figure 39B:
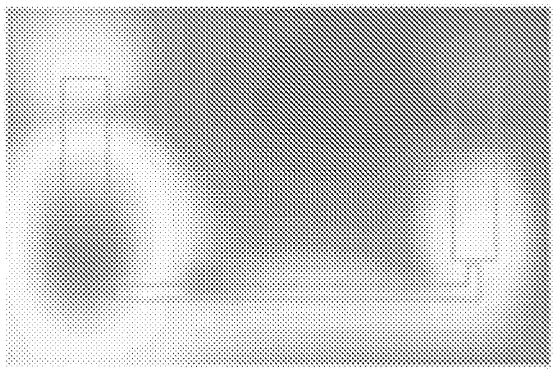
FIG. 39B is an electric field distribution diagram of an antenna apparatus at 1.9 GHz in an electronic device according to an embodiment of this application.
Figure 39C:
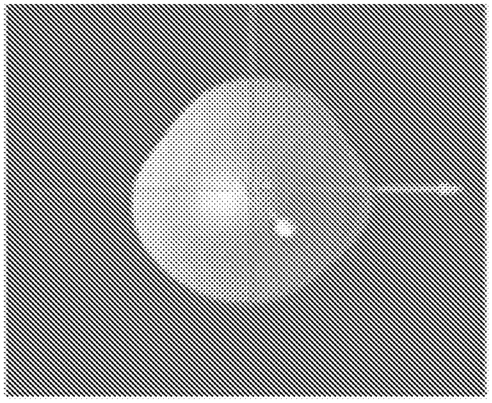
FIG. 39C is a radiation pattern of an antenna apparatus at 1.9 GHz in an electronic device according to an embodiment of this application.
Figure 40A:
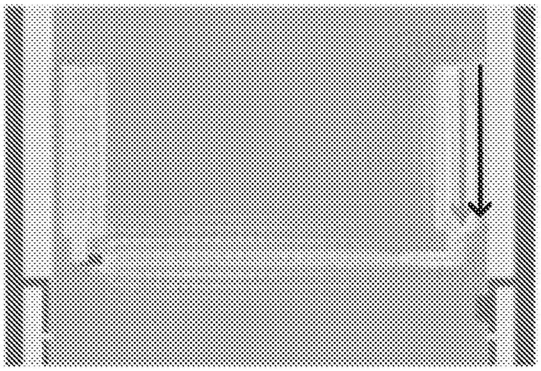
FIG. 40A is a current distribution diagram of an antenna apparatus at 2.01 GHz in an electronic device according to an embodiment of this application.
Figure 40B:
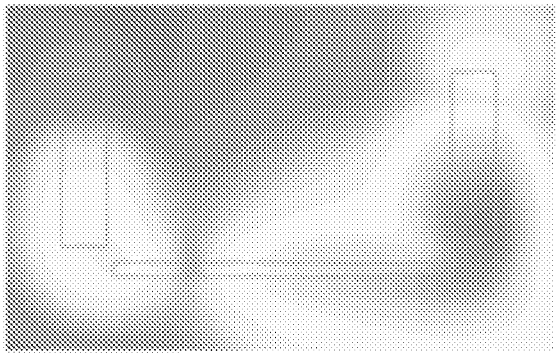
FIG. 40B is an electric field distribution diagram of an antenna apparatus at 2.01 GHz in an electronic device according to an embodiment of this application.
Figure 40C:
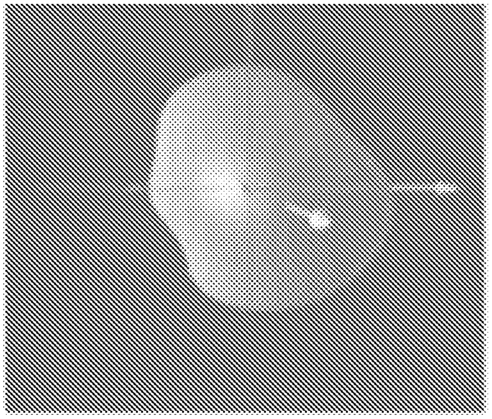
FIG. 40C is a radiation pattern of an antenna apparatus at 2.01 GHz in an electronic device according to an embodiment of this application.

In addition, FIG. 38A, FIG. 38B, and FIG. 38C are respectively a current distribution diagram, an electric field distribution diagram, and a radiation pattern corresponding to an antenna apparatus 100 at 1.3 GHz corresponding to a distributed feeding structure. FIG. 39A, FIG. 39B, and FIG. 39C are respectively a current distribution diagram, an electric field distribution diagram, and a radiation pattern corresponding to an antenna apparatus 100 at 1.9 GHz corresponding to a distributed feeding structure. FIG. 40A, FIG. 40B, and FIG. 40C are respectively a current distribution diagram, an electric field distribution diagram, and a radiation pattern corresponding to an antenna apparatus 100 at 2.01 GHz corresponding to a distributed feeding structure. After analyzing the current distribution diagram and the electric field distribution diagram corresponding to the three resonances of the antenna apparatus 100 corresponding to the distributed feeding structure, it is found that two high-frequency resonances are respectively generated by a first radiator 201 on a left side and a second radiator 202 on a right side. However, a low resonance is generated by a feeding branch in a coupling feeding element 10, and when an environment of the feeding branch is good, a length of the feeding branch may be adjusted, and may also be used to design a low-frequency antenna.

| | | Antenna apparatus shown in FIG. 32 | Antenna apparatus shown in FIG. 31A | |
|---|---|---|---|---|
| Input power 24 dBm | Resonant frequency | 1.88 GHz 10 g | 1.9 GHz 10 g | 2.01 GHz 10 g |
| | FS simulation efficiency (dB) | −5.10 | −4.90 | −5.10 |
| Simulation body SAR | Back −5 mm | 3.12 | 2.54 | 1.92 |
| Normalized efficiency | FS normalization (dB) | −5 | −5 | −5 |
| Normalized body SAR | Back −5 mm | 3.19 | 2.48 | 1.96 |

In addition, in the foregoing table, a 5 mm body SAR (electromagnetic radiation energy absorbed by a matter per unit mass and per unit time, measuring a thermal effect of terminal radiation) on a lower back surface of each of the two antenna structures such as the antenna apparatus 100 (a double resonance structure) shown in FIG. 31A and the antenna apparatus 100 (a single resonance structure) shown in FIG. 32 is compared. Through a distributed radiator feeding structure (the antenna apparatus 100 shown in FIG. 31A), compared with a single radiator feeding structure (for example, the left side single radiator feeding structure shown in FIG. 32), an SAR value of the single radiator feeding structure decreases by about 1 dB to 2 dB.

In embodiments of this application, other technical features are the same as those in Embodiment 1 or Embodiment 2, and a same or corresponding technical effect may be achieved. Details are not described herein again.

EMBODIMENT 4

Different from Embodiment 1, Embodiment 2, or Embodiment 3, in embodiments of this application, a radiator may feed and be connected to a metal frame antenna 30, and the radiator and the metal frame antenna 30 are combined to implement distributed feeding.

Embodiments of this application provide an electronic device. The electronic device includes: at least a middle frame 22 (a metal middle frame), a battery cover 25, and a battery 24 located between the metal middle frame and the battery cover 25, and further includes: an antenna apparatus 100. Specifically, referring to FIG. 41, the antenna apparatus 100 includes: a coupling radiation element 50, a feeding element 60, and at least three low-frequency antennas formed by a metal frame of the metal middle frame; and the coupling radiation element 50 is arranged close to one of the low-frequency antennas, one end of the feeding element 60 is coupled to and feeds the coupling radiation element 50, and another end of the feeding element 60 feeds one of the low-frequency antennas.

At least three low-frequency antennas are formed through the metal frame of the metal middle frame, a coupling radiation element 50 in an antenna apparatus 100 is arranged close to one of the low-frequency antennas, and one end of the feeding element 60 in the antenna apparatus IOU is coupled to and feeds the coupling radiation element 50. Another end of the feeding element 60 feeds one of the at least three low-frequency antennas. In this way, distributed feeding may be implemented by feeding and being connected to a metal frame antenna 30 through the coupling radiation element 50. This improves radiation performance of the antenna apparatus 100. In addition, design difficulty of the entire antenna apparatus 100 may be reduced to some extent.

The coupling radiation element 50 may include: at least one coupling radiator, and the coupling radiator is arranged on an inner surface of the battery cover 25; and the feeding element 60 is located between the coupling radiator and the low-frequency antenna, one end of the feeding element 60 is coupled to and feeds the coupling radiator, and another end of the feeding element 60 feeds the low-frequency antenna.

In a possible implementation, at least some coupling radiators are located between orthographic projection of one side frame of the middle frame 22 and the battery 24 towards the battery cover 25. In other words, a part or all of the structure of the coupling radiator is located between the side frame (a left side frame 2223 or a right side frame 2224) and an outer edge of the battery 24 (an outer edge of the battery 24 close to a side of the side frame). In this way, a part or all of the structure of the coupling radiator is not located in an orthographic projection area of the battery 24 towards the battery cover 25. In this case, the battery 24 does not block the coupling radiator or may block only a part of the structure of the coupling radiator. This avoids impact or interference on radiation performance that blocks the coupling radiator.

In embodiments of this application, the feeding element 60 is electrically connected to a feed, one end of the feeding element 60 is coupled to and feeds the coupling radiator, and another end of the feeding element 60 is electrically connected to the low-frequency antenna through a feeding cable, so that the feeding element 60 feeds the low-frequency antenna. In this way, an external feed feeds the feeding element 60, the feeding element 60 is coupled to and feeds the coupling radiator, and the feeding element 60 feeds the low-frequency antenna through a feeding cable. In this way, a process of feeding the coupling radiator and the low-frequency antenna through the feed is implemented.

It may be understood that a feeding form may be implemented through a wired cable (for example, a cable), a transmission cable, a floating metal structure, or the like. The feeding form in embodiments of this application includes but is not limited to the foregoing examples, and may be specifically flexibly set based on a requirement of an actual application scenario.

The feeding element 60 includes: a bracket and a feeding branch arranged on the bracket, where the feeding branch is electrically connected to the feed; and the bracket is fixed on the inner surface of the battery cover 25. The bracket is fixed on the inner surface of the battery cover 25, so that the feeding element 60 may be fixed. The feeding branch is electrically connected to the feed, so that the external feed may feed the feeding element 60. The feeding element 60 is coupled to and feeds the coupling radiator, and the feeding element 60 feeds the low-frequency antenna through the feeding cable, to implement a process of feeding the coupling radiator and the low-frequency antenna through the feed.

In embodiments of this application, the coupling radiation element 50 or the feeding element 60 may be a floating metal, a graphene layer, or a transparent conductive layer.

In addition, the antenna apparatus 100 provided in embodiments of this application may further include: at least one ground layer, where the ground layer is arranged close to one end of the coupling radiator and is coupled to and grounded with the coupling radiator; and the ground layer is further grounded to the low-frequency antenna through the feeding cable. In this way, the first radiator 201 may be coupled to and grounded with the middle frame 22 through the coupling ground layer 401 close to the first radiator 201. The coupling radiator may be coupled to and grounded with the middle frame 22 through the ground layer close to the coupling radiator, and the low-frequency antenna may be grounded to the middle frame 22.

Figure 41:
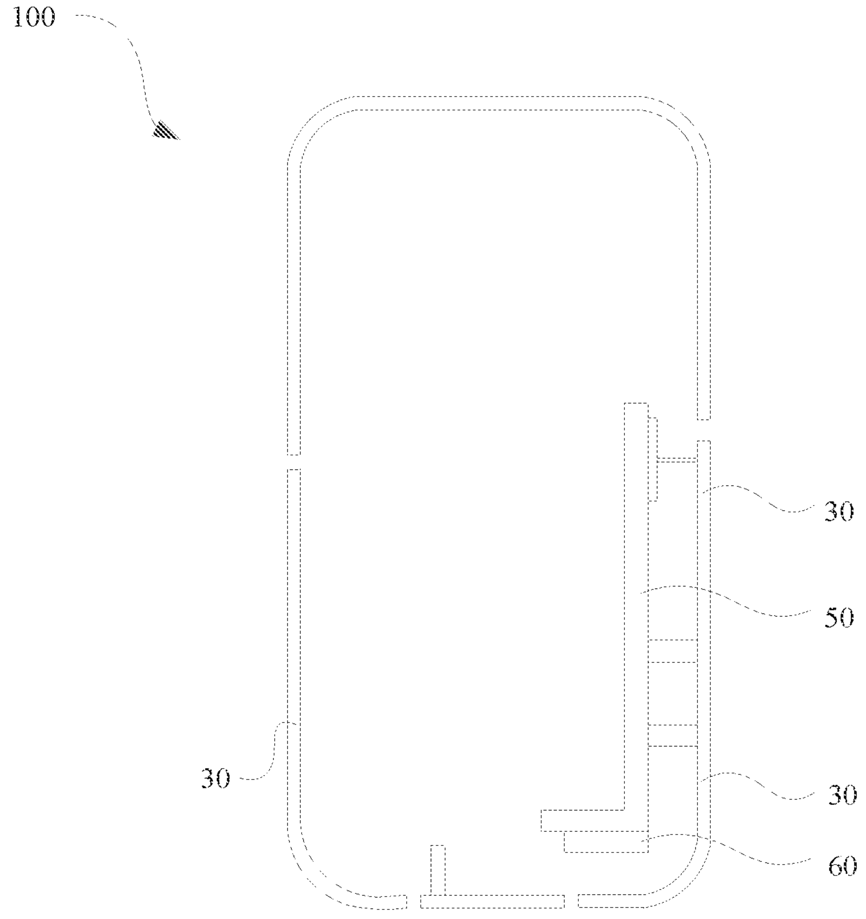
FIG. 41 is a schematic diagram of a structure of an antenna apparatus in an electronic device according to an embodiment of this application.
Figure 42:
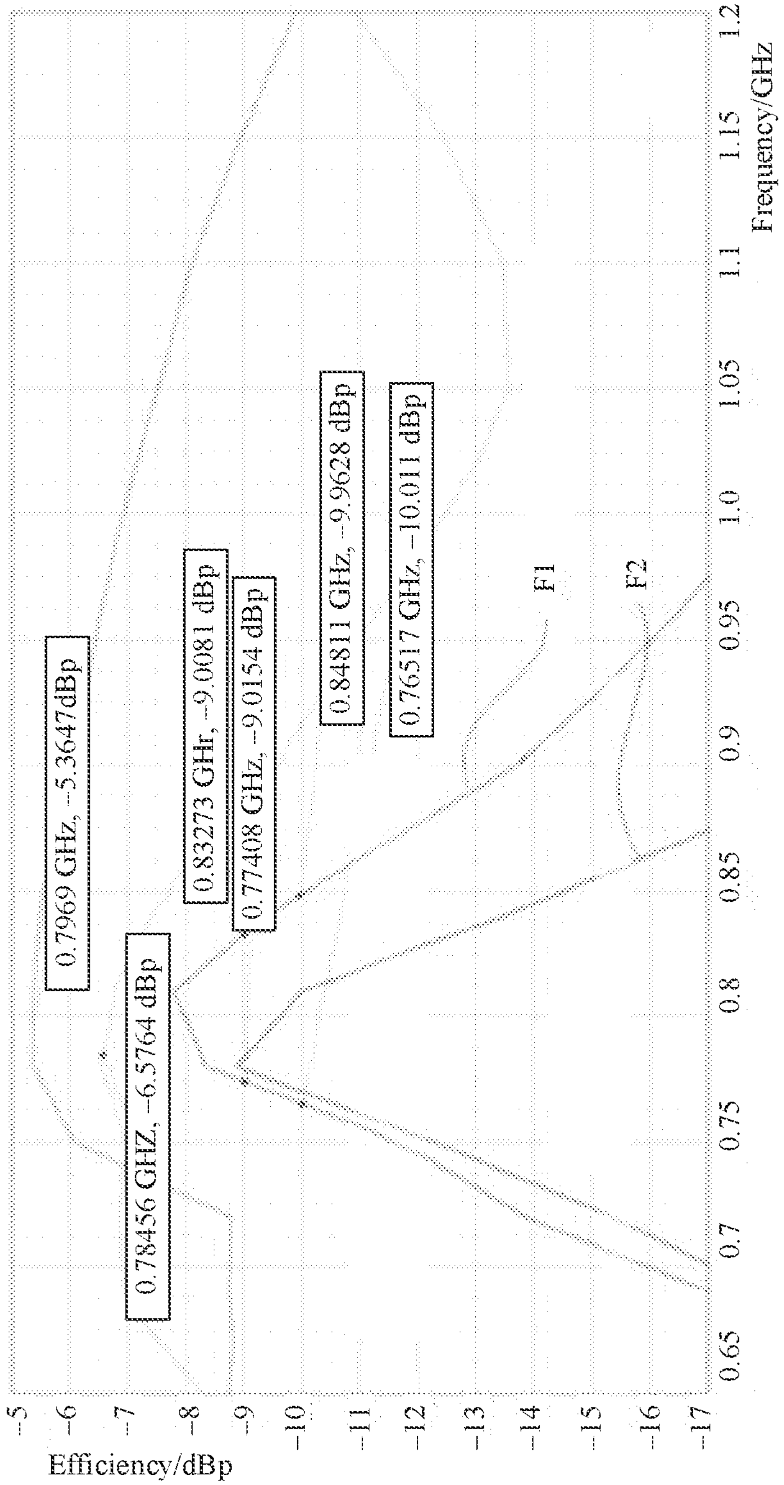
FIG. 42 is a performance comparison diagram of an antenna apparatus in an electronic device according to an embodiment of this application.
Figure 43:
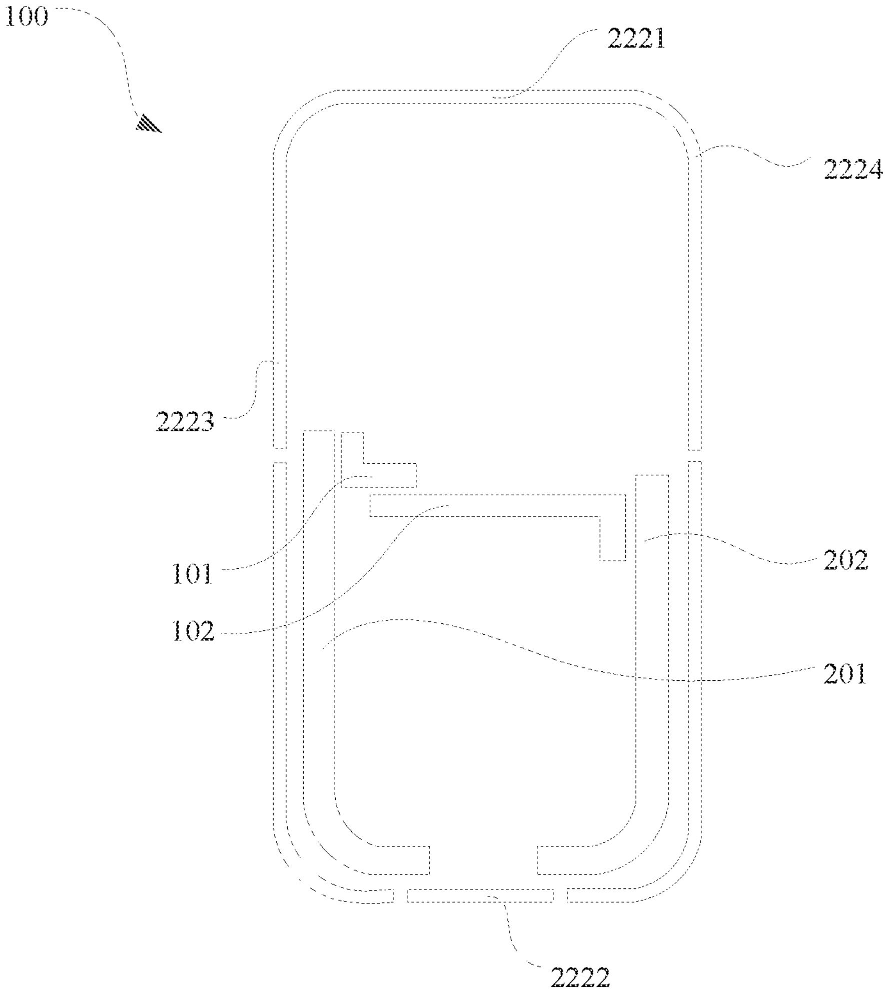
FIG. 43 is a schematic diagram of a structure of an antenna apparatus in an electronic device according to an embodiment of this application.
Figure 44:
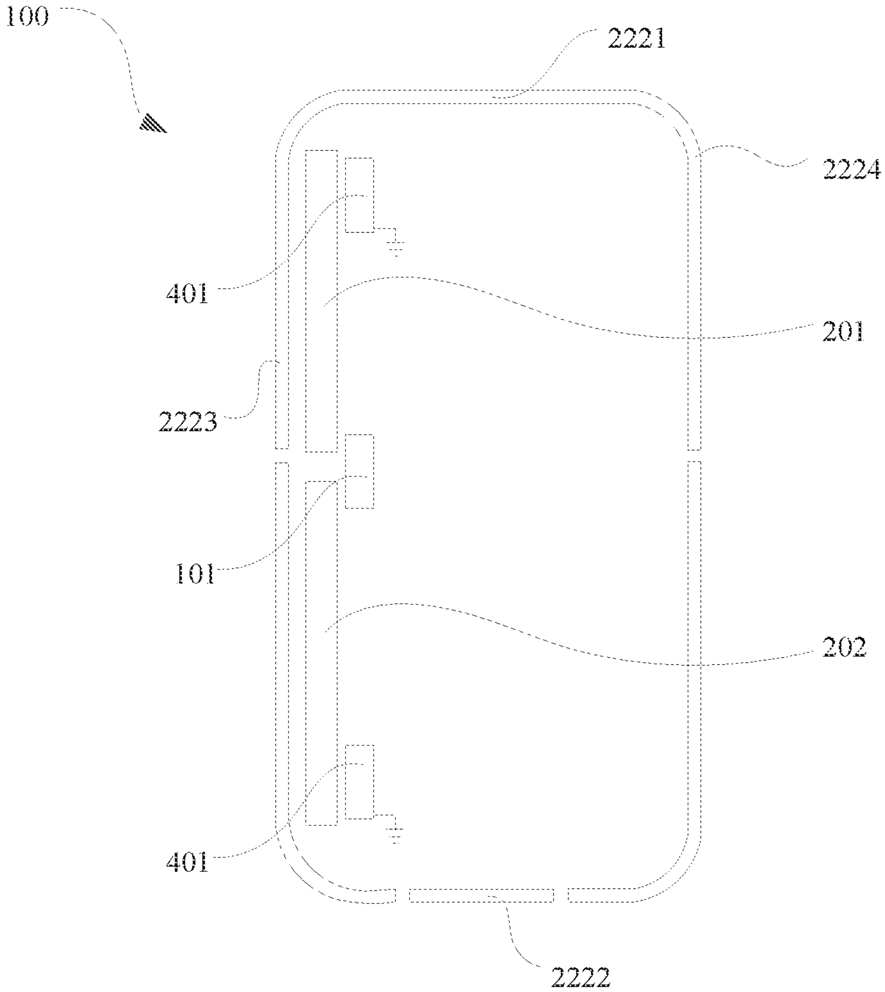
FIG. 44 is a schematic diagram of a structure of an antenna apparatus in an electronic device according to an embodiment of this application.

In summary, when the coupling radiator and the metal frame antenna 30 perform distributed feeding connection to improve radiation performance, referring to FIG. 42, F1 shows a curve diagram of efficiency corresponding to a distributed feeding antenna structure (a coupling radiator+a metal frame antenna 30) shown in FIG. 41. F2 shows a curve diagram of efficiency corresponding to an antenna structure in which only a metal frame antenna 30 is fed in the conventional technology. It may be learned from the figure that compared with an antenna structure in which only the metal frame antenna 30 is fed in the conventional technology, the distributed feeding antenna structure (the coupling radiator+the metal frame antenna 30) shown in FIG. 41 may improve efficiency of the distributed feeding antenna by 1.5 dB and a bandwidth is more than doubled.

In embodiments of this application, other technical features are the same as those in Embodiment 1, Embodiment 2, or Embodiment 3, and a same or corresponding technical effect may be achieved. Details are not described herein again.

In the description of embodiments of this application, it should be noted that, unless otherwise explicitly stipulated and restricted, terms "installation", "joint connection", and "connection" should be understood broadly, which, for example, may be a fixed connection, or may be an indirect connection by using a medium, or may be an internal communication between two components, or may be an interactive relationship between two components. A person of ordinary skill in the art may understand the specific meanings of the foregoing terms in embodiments of this application according to specific situations.

In embodiments of this application, it is implied that an apparatus or element in question needs to have a particular orientation, or needs to be constructed and operated in a particular orientation, and therefore cannot be construed as a limitation on embodiments of this application. In the description of embodiments of this application, unless otherwise exactly and specifically ruled, "a plurality of" means two or more than two.

The terms such as "first", "second", "third", and "fourth" (if any) in the specification and claims of embodiments of this application and in the accompanying drawings are used for distinguishing between similar objects and not necessarily used for describing any particular order or sequence. It may be understood that the data used in such a way is interchangeable in proper circumstances, so that embodiments of this application described herein can be implemented in other sequences than the sequence illustrated or described herein. Moreover, the terms "include", "contain" and any other variants mean to cover the non-exclusive inclusion. For example, a process, method, system, product, or device that includes a list of steps or units is not necessarily limited to those steps or units, but may include other steps or units not expressly listed or inherent to such a process, method, product, or device.

Finally, it should be noted that the foregoing embodiments are merely intended for describing the technical solutions of embodiments of this application other than limiting this application. Although embodiments of this application is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. An antenna apparatus comprising:

at least one group of coupling feeding elements, wherein each group of coupling feeding elements comprises:

a first coupling feeding element configured to electrically connect to a feed, wherein the first coupling feeding element comprises:

a bracket fixed to an inner surface of a cover of an electronic device; and a feeding branch arranged on the bracket, wherein the feeding branch is configured to electrically connect to the feed; and a second coupling feeding element; and at least one group of radiation elements, wherein each group of radiation elements comprises:

a first radiator; and a second radiator, wherein the first radiator and the second radiator are configured to arrange on the inner surface, wherein the first radiator and the second radiator are respectively located on two sides of the first coupling feeding element, wherein the first coupling feeding element is separately coupled to feed the first radiator and the second radiator, wherein the first coupling feeding element is separately coupled to feed the first radiator and one end of the second coupling feeding element, and wherein another end of the second coupling feeding element is coupled to feed the second radiator.

2. The antenna apparatus of claim 1, wherein at least one of the first radiator or the second radiator is further configured to be located between a first orthographic projection and a second orthographic projection on the cover, wherein the first orthographic projection is of a first side frame of a middle frame towards the cover and the second orthographic projection is of a battery towards the cover.

3. The antenna apparatus of claim 2, wherein the first radiator is further configured to be located between the first orthographic projection and the second orthographic projection on the cover, and wherein the second radiator is configured to be located between a third orthographic projection of a second side frame of the middle frame towards the cover and the second orthographic projection.

4. The antenna apparatus of claim 2, wherein the first radiator and the second radiator are configured to be disposed proximate to a first low-frequency metal frame antenna and a second low-frequency metal frame antenna of a metal frame.

5. The antenna apparatus of claim 4, wherein one end of the first radiator is configured to extend toward a top frame of the middle frame, wherein one end of the second radiator is configured to extend toward a bottom frame of the middle frame, wherein a fourth orthographic projection of the first low-frequency metal frame antenna towards the cover and the first radiator are respectively located on two sides of the second orthographic projection on the cover, and wherein a fifth orthographic projection of the second low-frequency metal frame antenna towards the cover and the second radiator are respectively located on the two sides of the second orthographic projection on the cover.

6. The antenna apparatus of claim 2, wherein the middle frame further comprises two side frames, a bottom frame and a top frame, and wherein:

one end of the first radiator is configured to extend toward a bottom frame of the middle frame of the electronic device, and one end of the second radiator is configured to extend toward the bottom frame; or one end of the first radiator extends toward a top frame of the middle frame, and one end of the second radiator extends toward the top frame; or one end of the first radiator extends toward a bottom frame of the middle frame, and one end of the second radiator extends toward a side frame.

7. The antenna apparatus of claim 1, wherein an electrical length of the first radiator and an electrical length of the second radiator ranges from ¼ λ to ½ λ, and wherein λ is a wavelength corresponding to a resonant frequency of each of the first radiator and the second radiator.

8. The antenna apparatus of claim 1, wherein the second coupling feeding element, the first radiator, and the second radiator comprise floating metals, graphene layers, or transparent conductive layers.

9. The antenna apparatus of claim 1, wherein an operating frequency band of the first radiator and an operating frequency band of the second radiator falls in a range from 700 megahertz (MHz) to 900 MHz.

10. The antenna apparatus of claim 1, further comprising at least one group of coupling grounding elements, wherein each group of coupling grounding elements comprises at least two coupling ground layers, wherein one coupling ground layer is arranged proximate to one end of the first radiator and is coupled to and grounded with the first radiator, and wherein another coupling ground layer is arranged proximate to one end of the second radiator and is coupled to and grounded with the second radiator.

11. An electronic device comprising:

a cover comprising an inner surface; and an antenna apparatus comprising:

at least one group of coupling feeding elements, wherein each group of coupling feeding elements comprises:

a first coupling feeding element configured to electrically connect to a feed, wherein the first coupling feeding element comprises:

a bracket fixed to the inner surface; and a feeding branch arranged on the bracket, wherein the feeding branch is configured to electrically connect to the feed; and a second coupling feeding element; and at least one group of radiation elements, wherein each group of radiation elements comprises a first radiator and a second radiator arranged on the inner surface, wherein the first radiator and the second radiator are respectively located on two sides of a coupling feeding element, wherein the coupling feeding element is separately coupled to feed the first radiator and the second radiator, wherein the first coupling feeding element is separately coupled to feed the first radiator and one end of the second coupling feeding element, and wherein another end of the second coupling feeding element is coupled to feed the second radiator.

12. The electronic device of claim 11, wherein the electronic device further comprises a metal middle frame defining at least two metal frame antennas.

13. The electronic device of claim 12, wherein the metal middle frame further comprises a first side frame and a second side frame, and wherein at least one of the first radiator or the second radiator is located between a first orthographic projection and a second orthographic projection on the cover, wherein the first orthographic projection is of the first side frame towards the cover and the second orthographic projection is of a battery towards the cover.

14. The electronic device of claim 13, wherein the first radiator is located between the first orthographic projection and the second orthographic projection on the cover, and wherein the second radiator is located between a third orthographic projection of the second side frame towards the cover and the second orthographic projection.

15. The electronic device of claim 11, wherein the second coupling feeding element, the first radiator, and the second radiator comprise floating metals, graphene layers, or transparent conductive layers.

16. The electronic device of claim 11, further comprising at least one group of coupling grounding elements, wherein each group of coupling grounding elements comprises at least two coupling ground layers, wherein one coupling ground layer is arranged proximate to one end of the first radiator and is coupled to and grounded with the first radiator; and wherein another coupling ground layer is arranged proximate to one end of the second radiator and is coupled to and grounded with the second radiator.

17. An electronic device comprising:
a cover comprising an inner surface;
a middle frame;
a battery located between the middle frame and the cover; and
an antenna apparatus comprising:
at least one group of coupling feeding elements, wherein each group of coupling feeding elements comprises:
a first coupling feeding element configured to electrically connect to a feed, wherein the first coupling feeding element comprises:
a bracket fixed to the inner surface; and
a feeding branch arranged on the bracket, wherein the feeding branch is configured to electrically connect to the feed; and
a second coupling feeding element; and
at least one group of radiation elements,
wherein each group of radiation elements comprises a first radiator and a second radiator arranged on the inner surface,
wherein the first radiator and the second radiator are respectively located on two sides of a coupling feeding element,
wherein the coupling feeding element is separately coupled to feed the first radiator and the second radiator,
wherein the middle frame defines at least two metal frame antennas in the antenna apparatus,
wherein each of the at least two metal frame antennas is a groove antenna formed by providing slots on the middle frame,
wherein the groove antenna comprises a first part, a second part, and a third part that are separated by a slot of the slots, and
wherein a non-conductive material is filled between the first part and the second part, between the second part and the third part, and between the third part and the first part.

18. The antenna apparatus of claim 17, wherein at least one of the first radiator or the second radiator is further configured to be located between a first orthographic projection and a second orthographic projection on the cover, wherein the first orthographic projection is of a first side frame of the middle frame towards the cover and the second orthographic projection is of a battery towards the cover.

19. The electronic device of claim 17, wherein each group of coupling feeding elements comprises:
a first coupling feeding element; and
a second coupling feeding element,
wherein the first coupling feeding element is configured to electrically connect to a feed,
wherein the first coupling feeding element is separately coupled to feed another end of the first radiator and one end of the second coupling feeding element, and
wherein another end of the second coupling feeding element is coupled to feed another end of the second radiator.

20. The electronic device of claim 19, wherein the first coupling feeding element comprises:
a bracket fixed to the inner surface; and
a feeding branch arranged on the bracket, wherein the feeding branch is configured to electrically connect to the feed.

* * * * *